(12) United States Patent
Santiago et al.

(10) Patent No.: US 10,838,376 B2
(45) Date of Patent: Nov. 17, 2020

(54) METHOD OF GENERATING FUZZY KNOWLEDGE BASE FOR A PROGRAMMABLE FUZZY CONTROLLER

(71) Applicant: I.Systems Automação Industrial S.A, Campinas (BR)

(72) Inventors: Igor Bittencourt Santiago, Campinas (BR); Ronaldo Antonio da Silva, Campinas (BR); Danilo Lavigne Halla, Campinas (BR)

(73) Assignee: I.Systems Automação Industrial S.A, Campinas (BR)

(*) Notice: Subject to any disclaimer, the term of this patent is extended or adjusted under 35 U.S.C. 154(b) by 1298 days.

(21) Appl. No.: 14/850,211

(22) Filed: Sep. 10, 2015

(65) Prior Publication Data

US 2017/0075324 A1    Mar. 16, 2017

(51) Int. Cl.
G05B 13/02     (2006.01)
G06N 7/02      (2006.01)

(52) U.S. Cl.
CPC ..... G05B 13/0295 (2013.01); G05B 13/0275 (2013.01); G06N 7/023 (2013.01); *Y02P 80/21* (2015.11)

(58) Field of Classification Search
CPC .................................................. G05B 13/0275
See application file for complete search history.

(56) References Cited

U.S. PATENT DOCUMENTS 6,078,911 A * 6/2000 Bonissone ............... G06N 7/04
706/52

2004/0162638 A1* 8/2004 Solomon ................. F41H 13/00
700/247
2006/0251320 A1* 11/2006 Diederichs ............... G07D 7/12
382/165

OTHER PUBLICATIONS

Khatib, Real-time obstacle avoidance for manipulators and mobile robots, International Journal of Robotics Research, vol. 5, No. 1, pp. 90-98, 1986.*
Tu, K.-Y. et al., "Fuzzy potential energy for a map approach to robot navigation," Robotics and Autonomous Systems, vol. 54 (2006) pp. 574-589. (Year: 2006).*
Wang, W.-J. et al., "Flexible stability criteria for a linguistic fuzzy dynamic system," Fuzzy Sets and Systems, vol. 105 (1999) pp. 63-80. (Year: 1999).*

* cited by examiner

*Primary Examiner* — Kakali Chaki
*Assistant Examiner* — Brian M Smith
(74) *Attorney, Agent, or Firm* — Blank Rome LLP

(57) ABSTRACT

A method of generating the knowledge base used for a programmable fuzzy controller comprising the steps of determining the relevant input and output variables to be controlled; creating artificial potential fields for each of said variables; sampling each of said potential fields in order to generate fuzzy membership functions; compiling said fuzzy membership functions into fuzzy sets; and mapping inputs fuzzy set to output fuzzy sets through a rule base. The relevant input and output variables are including: minimum, maximum, and equilibrium values; an importance weight; a non-linearity value; a control direction; and information as to whether said variable is an input or output variable. Further provided is a programmable fuzzy controller whose fuzzy knowledge base is obtained by the method described.

20 Claims, 25 Drawing Sheets

METHOD OF GENERATING FUZZY KNOWLEDGE BASE FOR A PROGRAMMABLE FUZZY CONTROLLER

COMPUTER PROGRAM LISTING APPENDIX

The Appendix is a computer program listing source code used in a fuzzy controller and is incorporated herein by reference.

BACKGROUND OF THE INVENTION

1. Field of the Invention

The present invention relates to a programmable fuzzy controller, which uses an artificial potential field approach in order to automatically generate the knowledge base used in a fuzzy controller, whereby thousands of rules can be generated from multiple inputs and outputs, and the membership functions that describe these inputs and outputs.

2. Description of the Related Art

The artificial potential field method was originally developed as an alternative collision avoidance system for robotic manipulators. The manipulator would move in an abstract field of mathematically determined forces, where the position to be reached would be defined as an attractive pole, and obstacles to be avoided would be defined as repulsive surfaces.

Fuzzy logic is a mathematical system that analyzes analog input values in terms of logical variables that take continuous values between 0 and 1. These logical variables are generally mapped as sets of membership functions known as fuzzy sets. The collection of fuzzy sets used in the entire system to interpret inputs and outputs is known as the fuzzy knowledge base.

The application of fuzzy logic theory to control systems is known as fuzzy control. Although fuzzy control is one of the approaches used to implement advanced process controllers (e.g. for use in the control of chemical processes), it is highly dependent on expert knowledge for its configuration, instead of empirical or theoretical modeling. In particular, experts are called upon to supply the appropriate fuzzy sets that will make up the fuzzy rule base.

After strong initial interest in the 1980s and 90s fuzzy controllers fell out of vogue after the year 2000 and there has been little academic or commercial interest since. The problem which caused this decline in interest was the obstacle imposed by the need for manual development of the fuzzy rule base by a human expert. Commercial resources as well as academic interests shifted to automatic learning systems which were not subject to this requirement, such as Neural Networks, Bayesian Networks and Support Vector Machines. Automatic learning systems need less specific knowledge of the underlying process for their practical application, which make them preferable to fuzzy control systems.

The task of developing membership functions and fuzzy rules by experts in fuzzy logic is an empirical and difficult-to-maintain work. Alterations in the intervals of either input or output variables of the controlled process would require changes either in the rule base or in the membership functions only an expert in fuzzy logic is capable of carrying out. This need limited the use of fuzzy controllers in practical industrial applications because of the scarcity and high cost of such trained professionals.

Some controllers were developed that enabled adaptation of pre-established membership functions and fuzzy rule base. Although those controllers did reduce the need for experts in fuzzy logic, they required experts in database and/or online learning for their operation. These new experts were required because a controller that is obtained through analysis of data must be based on information that is representative of the process being controlled. If the database is not representative, the controller may exhibit undesired and even dangerous behaviors due to incorrect correlations derived from the supplied data.

In a further attempt to increase the adoption of fuzzy controllers and overcome the need for experts to configure and tune these systems, the International Electrotechnical Commission (IEC) proposed Rule no 61131-7, which called for the standardization of the programming of the fuzzy controllers in the year 2000. This IEC61131-7 standard was adopted by some manufacturers of Programmable Logical Controllers (PLC) and Distributed Control Systems (DCS), hoping to create an interchangeable platform of fuzzy controllers, but it failed to solve the need-for-an-expert problem, which continued to cause a decline in the adoption of fuzzy controllers in industry.

EP 0355716 defines a method of generating rules for fuzzy inference with main benefits in automation of the working-out of rules and automated adjustment of the database membership functions. The automation of the generation of fuzzy rules represents an important advance in spreading fuzzy controllers, a challenge to which EP 0355 716 contributed by modeling a fixed number of functions of pertinence to a pre-established database. A large number of linguistic variables contribute with a better resolution of the fuzzy controller, a small and fixed value in said patent. The invention proposed in this document, Learning Fuzzy Control eliminates the need for previous databanks and determines automatically the number of linguistic variables and of membership functions with a view to optimize the resolution of the fuzzy controller generated automatically.

EP 2169484 proposes a fuzzy system specializing in the production of cement, which provides robust indicators of temperature profile of the cement rotary furnace equipment. The main benefit was to treat the information in a robust manner, to determine which information was contradictory in a first analysis, and to provide reliable information to a model predictive control (MPC) controller. The patent proposed now, besides generating the fuzzy system automatically, eliminates the need to use a MPC controller. The Learning Fuzzy Control goes from the analysis of the indicators to the direct writing on the final control element.

The current art fails to provide a practical method for automatic generation of a fuzzy knowledge based controller.

SUMMARY OF THE INVENTION

The controller according to the present invention is capable of interacting directly with the process to be controlled through A/D and D/A converters, and the user does not need to have any knowledge of fuzzy logic to generate fuzzy controllers with multiple inputs and multiple outputs (MIMO). In order to work out the knowledge base of the fuzzy controller, it is necessary to provide the programmable controller (PC) with analogical inputs that contain, for each variable to be controlled: the minimum (real domain), maximum (real domain), equilibrium point (real domain), importance weight (from 0% to 100%), non-linearity (real domain), control direction (−1 or 1 for reverse and direct acting control, respectively), and whether the variable is an input or an output (−1 or 1).

In a simplified manner, the Learning Fuzzy Control is carried out in three phases:

(i) Creation of the potential fields for each variable (reading or writing) of the PC: the minimum, equilibrium point, maximum and non-linearity are parameters of a linear and derivable function that generates a linear potential field (F[x]) for each variable. The potential field should always have its minimum value F[x]=0 for x=equilibrium point.

(ii) Sampling of the potential fields and generation of the membership functions: each potential field is sampled with small steps (x+Δx) with respect to F[x]. For each sampling $x_j$ a pertinence function is generated, the area of which is proportional to F[x], that is to say, the greater the F[x] the larger the area of the membership function. Therefore, the closer the $x_j$ is to the equilibrium point value, the lower the F[x] value will be, and consequently the area of the membership functions will also be smaller. Many membership functions with reduced areas generate an attraction area around the equilibrium point value, replicating the behavior of the potential field in the set of linguistic variables of the fuzzy system.

(iii) Creation of the fuzzy knowledge based controller: after the end of the previous phase, there is a set of membership functions for each PC variable; in this phase the variables are separated into input and output groups, and the input/output mapping is carried out according to the information of the control signal. If the control direction is 1 (direct), the first membership functions of the input variable are connected to the first membership functions of the output variable; if the control direction is −1 (reverse), the first membership functions of the input variable are connected to the last membership functions of the output variable.

After phase (iii), the Learning Fuzzy Control has generated a complete fuzzy control system which may be carried out by a controller adherent to the international standard IEC 61131-7.

BRIEF DESCRIPTION OF THE DRAWINGS

The present invention has other advantages and features which will be more readily apparent from the following detailed description of the invention and the appended claims, when taken in conjunction with the accompanying drawings, in which:

DETAILED DESCRIPTION

Figure 1:
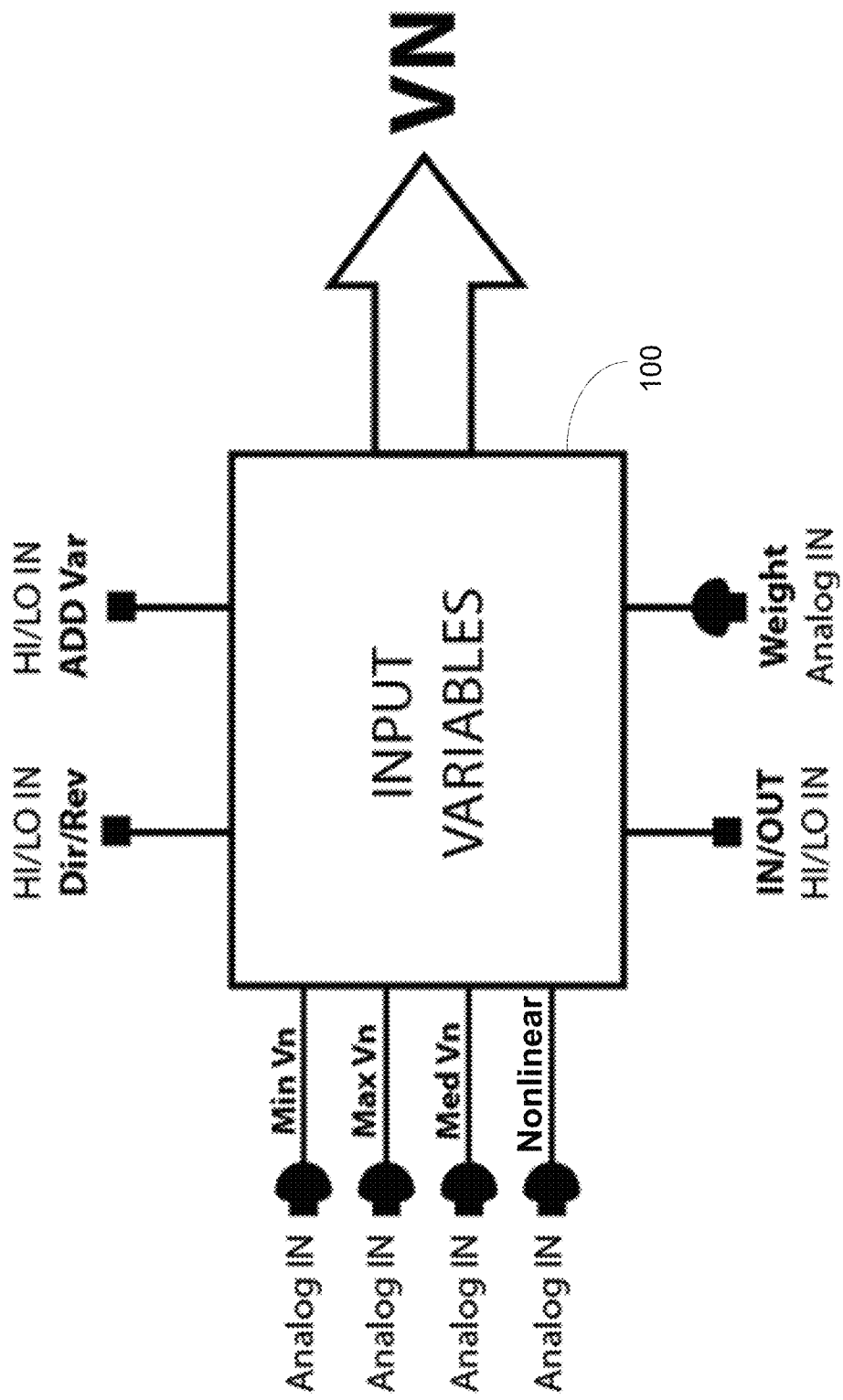
FIG. 1 is an illustration of a component of expression of variables in parameters through analogical inputs.

Artificial potential fields were used initially as algorithms for robot locomotion. The first mention of this approach was used by Oussama Khatib in 1986. The initial objective of this approach was to generate behaviors on robots to make them capable of carrying out autonomous navigation, avoiding (repulsive) obstacles and to cause them to be attracted by pre-established goals.

The attraction/repulsion surface may be quite flexible, starting from a cone (on a three-dimensional attractor) up to complex forms with singularities. Generating attraction surfaces for larger sizes is no problem either. It is only necessary to increase the number of input variables.

At present, the artificial potential fields are used on computer games to govern the movements of artificial intelligence of the opponents. The latter are attracted by the human players and repelled by dangers such as fire or by the shooting field of the human players, for instance.

The artificial potential field approach derives from a simple premise: avoiding places that present damage (repulsing) and approaching places that present benefits (attracting).

An industrial controller should keep the control variable as close to the set-point as possible, thus reducing the variability as much as possible.

Safe and robust industrial controllers alter the actuator values gradually and without bumps. The mathematics present to generate the potential fields guarantees that there will be no leaps (if there is no singularity in the equation), and it is guaranteed that there will be only one attraction point (the setpoint in the case of the control variable).

The decision of the attraction point for the values of the actuators and for the disturbance variables is not so obvious.

There is no real value for these variables. However, the equipment operators and the process engineers are capable of estimating values that, from experience, are kept when the process remains stable. These values obtained through experience are defined as attractors both for the manipulated variables and for the disturbance variables.

The main challenge was to decide which advanced control approach would be the ideal base for applying the inspiration described above.

The traditional Proportional Integral and Derivative (PID) control strategy can be viewed as a simplification of the inspiration of the potential fields. The setpoint is the attractor and the factors Kp, Kd, Ki make the mapping between the difference between the setpoint and the controlled variable (controller error).

The simplification of the PID entails limitations to the modeling of the controller, as for instance:

Symmetry: positive errors with respect to the setpoint have an action of the manipulated variable with the same module as negative errors;

Linearity: the relation between the controller error and the manipulated variable will be the same, regardless of the setpoint or operational characteristic of the equipment, since after all the relation depends upon the constants Kp, Kd, Ki alone;

Being based on accumulators: the controller errors are weighed by the constants Kp, Kd, Ki and added up to determine the value of the manipulated variable, this characteristic prevents the "instantaneous" actions of the automatic controller. Another deficiency are systems with long times between the action of the manipulated variable and the impact on the value of the controlled variable (dead time); they are very difficult to tune (finding good values for Kp, Kd, Ki);

An input variable and an output variable: the standard PID evaluates only the control variable for its decision of the manipulated variable. There are known modifications for reading two or more variables (PID feed-forward), but after three input variables it is very difficult to tune a PID. For example, some processes need to monitor more than ten variables (one control variable and nine disturbance variables).

The PID control approach has critical limitations that make it unfeasible as a base control platform for application of the inspiration of the artificial potential fields. Other multivariable approaches for controlling industrial processes are: control by process model and control through specialist systems.

Model-based controllers start from the premise that it is possible to develop a (linear or non-linear) model of the process from a database that represents all the states of the process or by working out differential equations that govern the process. In this way, the operation will be defined by the inferences of the controller on the modeled process. The main technologies used in control through process modeling are neural networks and Model Predictive Control (MPC). Neural networks use a non-linear black-box model of the process, without any relation with real physics. Therefore, they are subject to lack of robustness and low extrapolation capacity. MPCs use linear dynamic models with multiple inputs and multiple outputs. Since industrial processes have strong non-linearity, the MPCs do not manage to capture the whole dynamics of the plant. Besides, all the model-based controls need re-tuning in when there are changes in the process, which increases the effort and the system maintenance costs.

The specialist systems have the objective of minimizing the control actions desired by the operation and process teams. Therefore, what is modeled is the ideal behavior of the controller, rather than the process itself. Usually the automatic control systems that use the approach through specialist systems are developed manually, that is to say, the rule base that governs the controller behavior is defined manually by a specialist.

The emulation of a control strategy based on the behavior starts from the premise that this strategy is not implemented at present, be it due to limitation in executing the control actions at the velocity of an algorithm or due to the analysis and interpretation of a large number of sensors available. Since there is no database, there is no way to carry out learning from data.

Specialist systems should be capable of emulating the behavior of the human specialist. The approach through artificial potential fields present a useful simplification, reducing the scope of all the possible behaviors of the specialist to only the behaviors that aim at reducing the overall error with respect to the attractors.

By transforming all the variables into potential fields, whether these are inputs or outputs, of the Fuzzy controller has simplified the problem of working out the rule base to the point that it is possible to generate the Fuzzy knowledge base automatically. The only information necessary a priori are: the upper and lower limits (MinVn and MaxVn), the equilibrium point of all the variables (MedVn) and the evaluation of how non-linear the variable is (NonLinear). With only these four types of information it is possible to generate an attractor of a size for the chosen equilibrium point. One should inform whether the configured variable is a reading or writing (IN/OUT) variable. The weight of the variable in evaluating the value of the output/writing (Weight) variable is another configuration factor for the input variables (if the configured variable is for writing/output, the weight information will be disregarded). One should insert the information if the input variable has a direct or reverse (Dir/Rev) relation with the output variable (if the variable is an output one, this information is disregarded). VN is a bus that has the information MinVn, MaxVn, MedVn, NonLinear, IN/OUT, Analog In, Dir/Rev for each reading or writing variable of the system.

The application of the potential field approach in generating Fuzzy rules enables multivariable advanced controller systems to be developed in a matter of minutes or hours, instead of months or years.

In FIG. 1, one describes the Input Variables component 100 responsible for capturing the configuration parameters of each variable and transferring, through bar, to the next component. The function thereof is simply to convert the analogical inputs, make them available on the bar and communicate them to the next component, Signal Former. The parameters will be used for defining the Fvn functions for each linguistic variable Vn.

Figure 2:
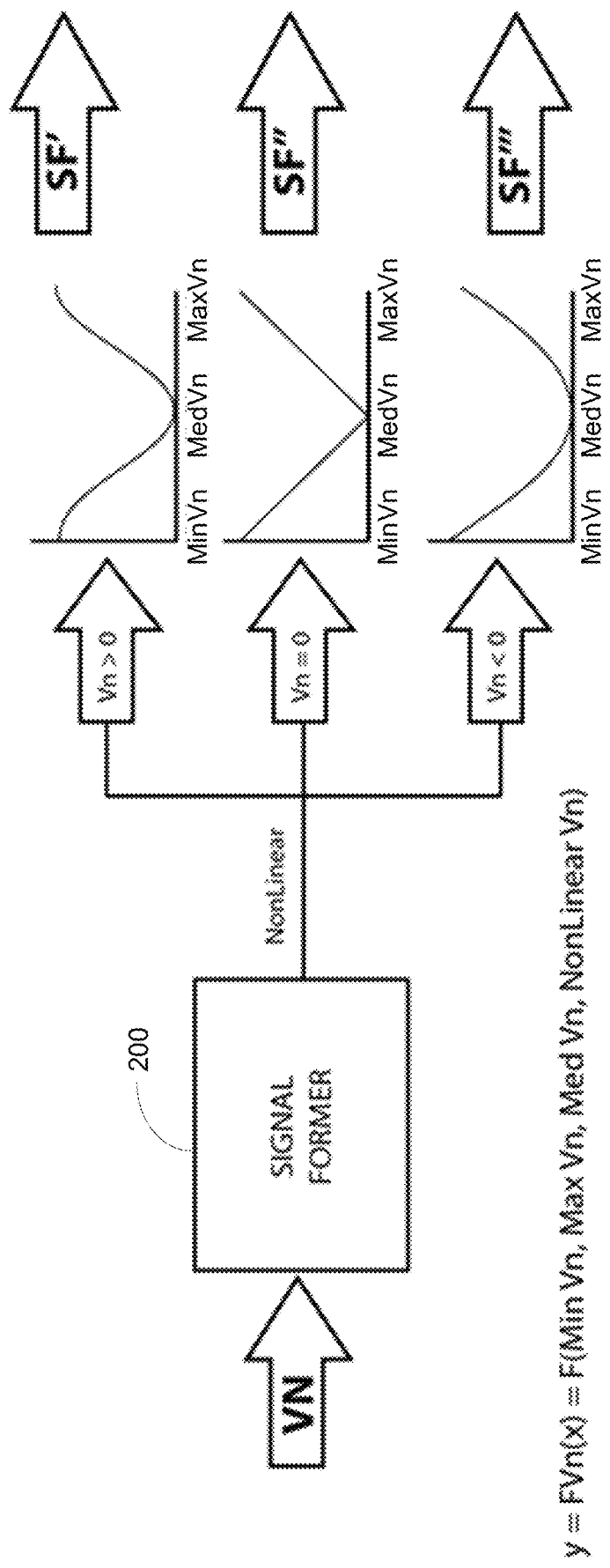
FIG. 2 is an illustration of a component that forms the base signal of the potential field for sampling the variables.

In FIG. 2, one describes the component responsible for generating the potential fields defined by the function Fvn. This function should be continuous, with only a minimum value between the intervals of the lowest value configured of the variable and its respective highest value. The minimum value of the function F should be exactly the equilibrium point value of the linguistic variable selected.

Figure 3:
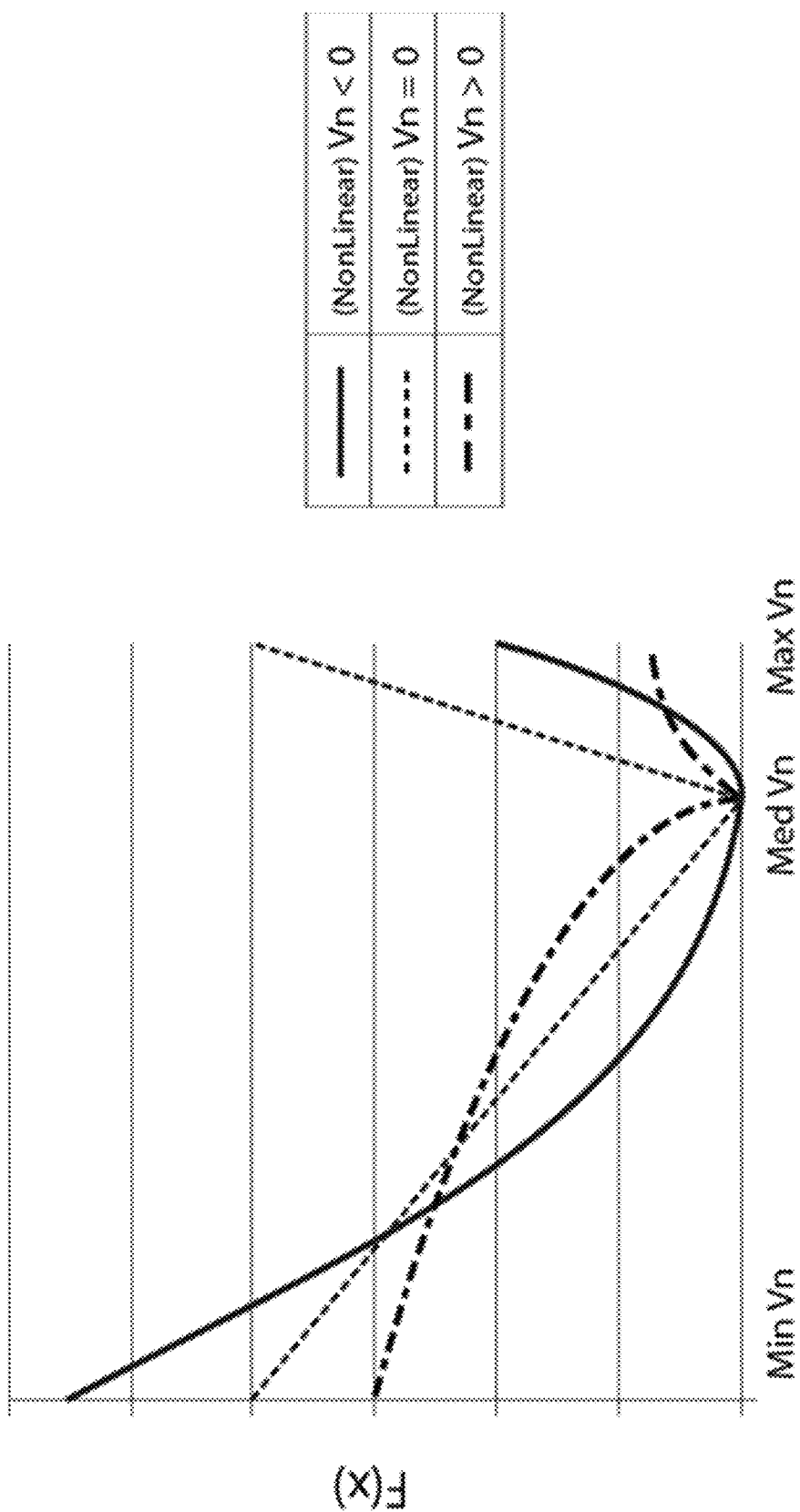
FIG. 3 is an illustration of an example of different functions following the restrictions of Minimum, Equilibrium point and Maximum.

Below is an example for better demonstration of the component function:

The component Signal Former 200 composes the wave function for each linguistic variable according to the parameters: minimum, equilibrium point, maximum and non-linearity degree. This wave function is sent to the next component for carrying out the sampling (also known as quantization) with a view to generate the fuzzy pertinent functions for all the linguistic variables of the fuzzy process controller. It is important to observe a few characteristics: asymmetry between the left side of the speech universe of FIG. 3 (between minimum and equilibrium point) and the right side (between equilibrium point and maximum). Another important factor is the non-linearity degree which may be imposed on Fvn(x) through different derivatives between the left side and the right side of the function Fvn(x).

Figure 4:
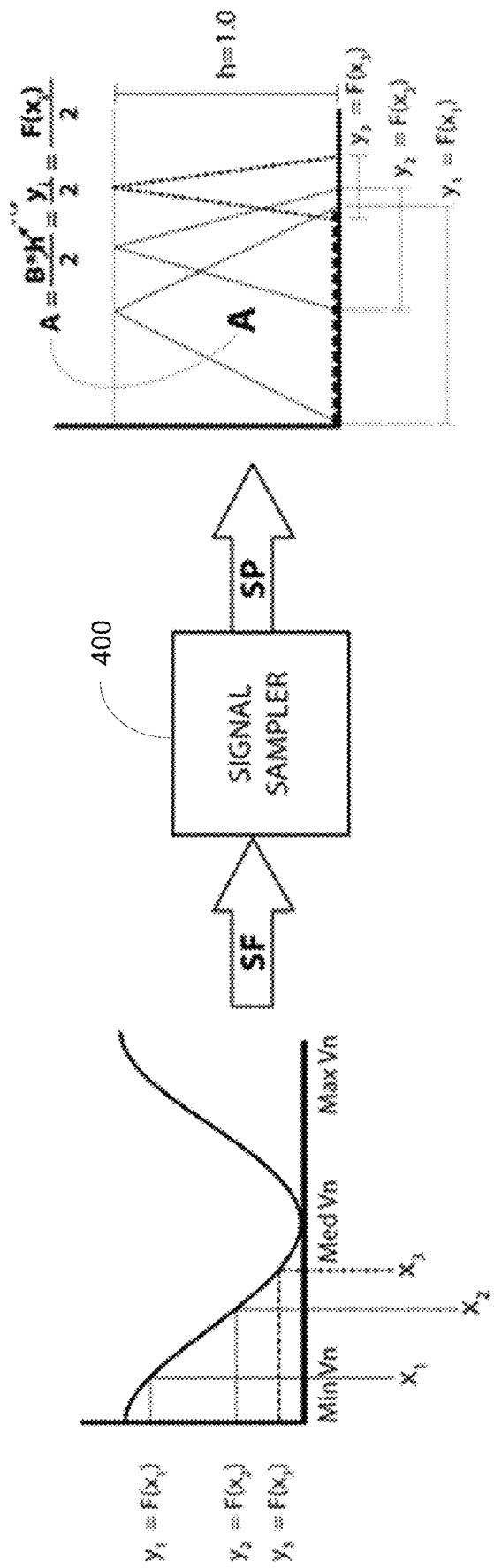
FIG. 4 is an illustration of a summary of the sampling of Fvn for generating the membership function.

The component Signal Sampler 400 represents the link between the artificial potential field approach and the fuzzy logics. In the proposed example, one presents the membership functions that are shaped as triangular functions with maximum height value equal to 1. Other membership functions such as Gaussian (bell-shaped) ones may be used. All the membership functions sampled from the function Fvn compile a fuzzy set as described in FIG. 4.

Figure 4A:
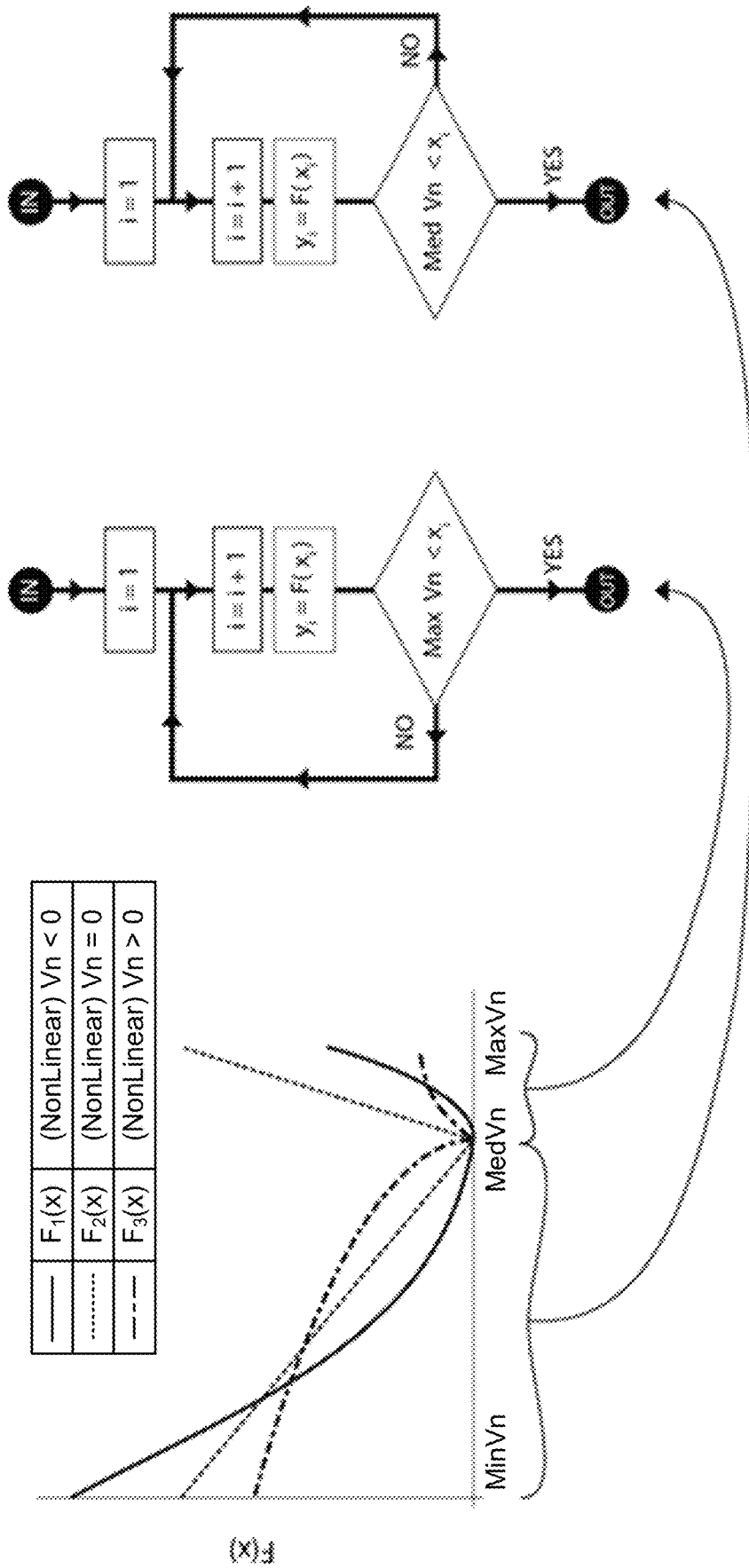
FIG. 4A is an illustration of interactions for sampling of the left side and of the right side of F(x)

One presents an example of the sampling in FIG. 4A. Two sampling efforts are carried out: one for the left side and the other for the right side. This is necessary because MedVn may be closer to MinVn or MaxVn. It is important to initiate and end each of the linguistic variables with membership functions with a high value. Therefore, in the values MinVn and MaxVn there will be membership functions with value of 1.0 (in the case represented by the first and by the last right triangle). The size of the base of these triangles will be proportional to $Fvn(x_i)$, wherein the base of the first right triangle will be proportional to the first sampling on the left Fvn (Min Vn+$x_i$) and the base of the last right triangle will be proportional to the last sampling on the right Fvn (Med Vn+$v_i$).

Interactions in FIG. 4A aim at illustrating the process of filling up the other membership functions to fill all the interval of the fuzzy set. By using the maximum of the membership function the value 1.0 (standard in normalizing the fuzzy antecedents) and isosceles triangles, the area of each membership function will be equal to $Fvn(x_i)/2$. This simplification aims at raising the velocity of obtaining the membership functions.

Figure 4B:
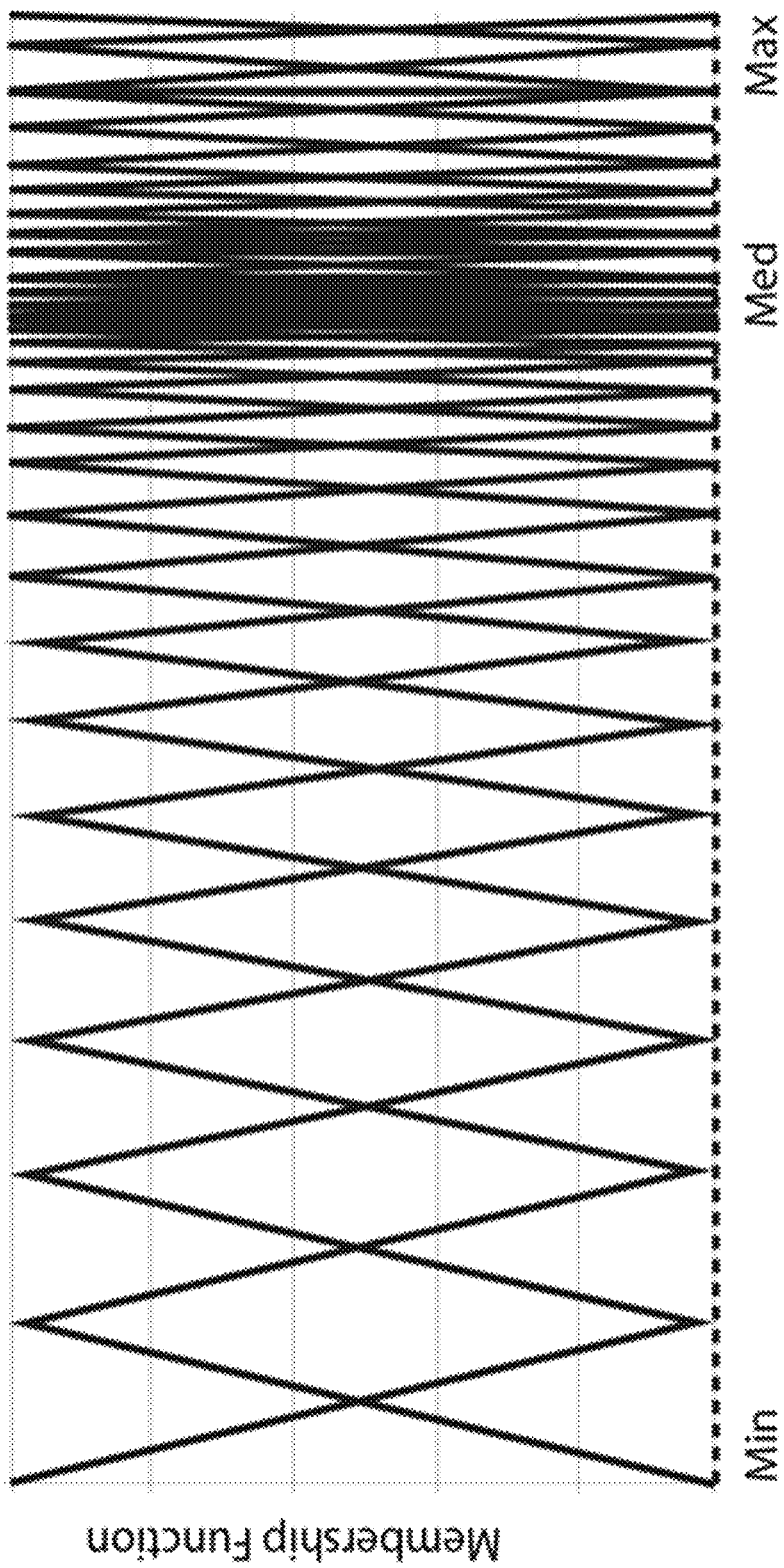
FIG. 4B is an illustration of fuzzy set using the non-linearity value <0.
Figure 4C:
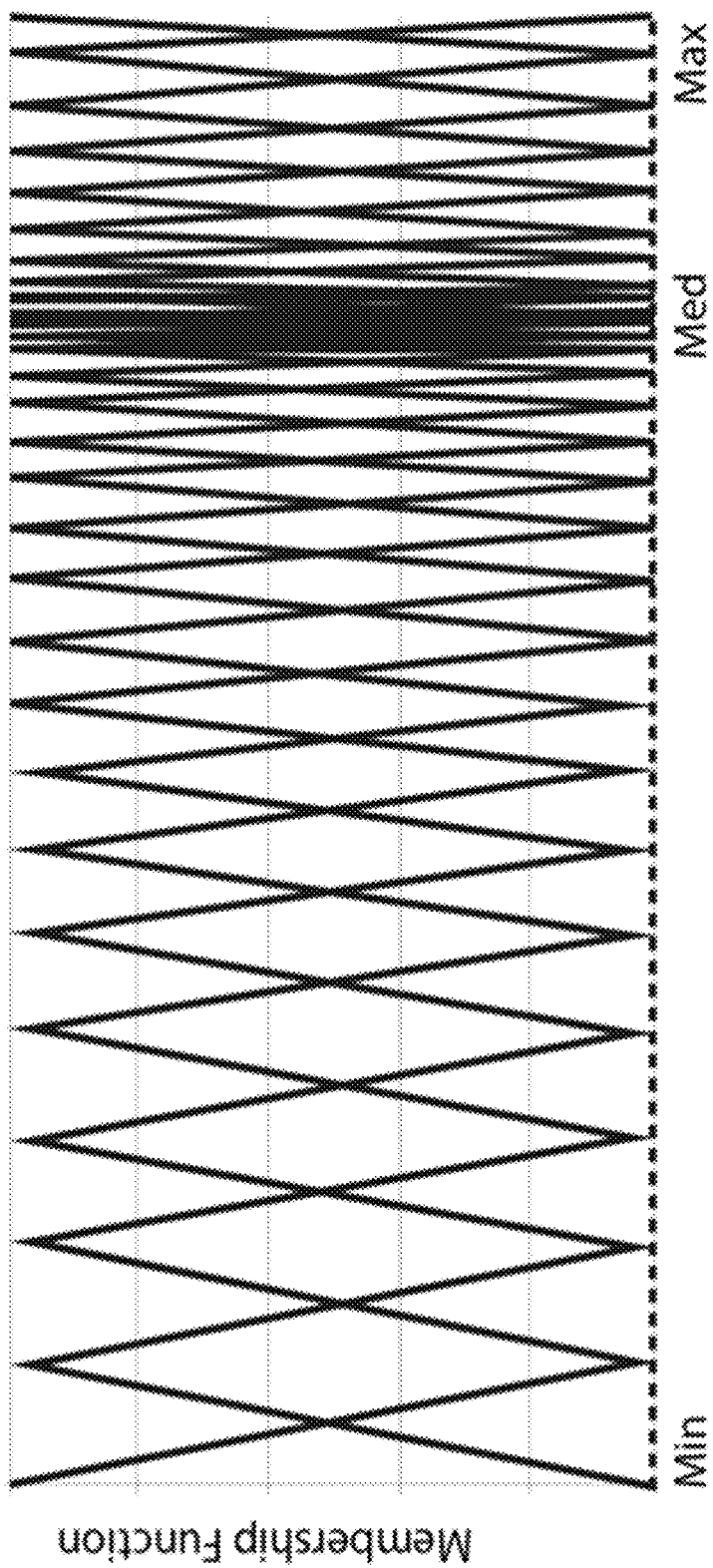
FIG. 4C is an illustration of fuzzy set using non-linearity value=0.
Figure 4D:
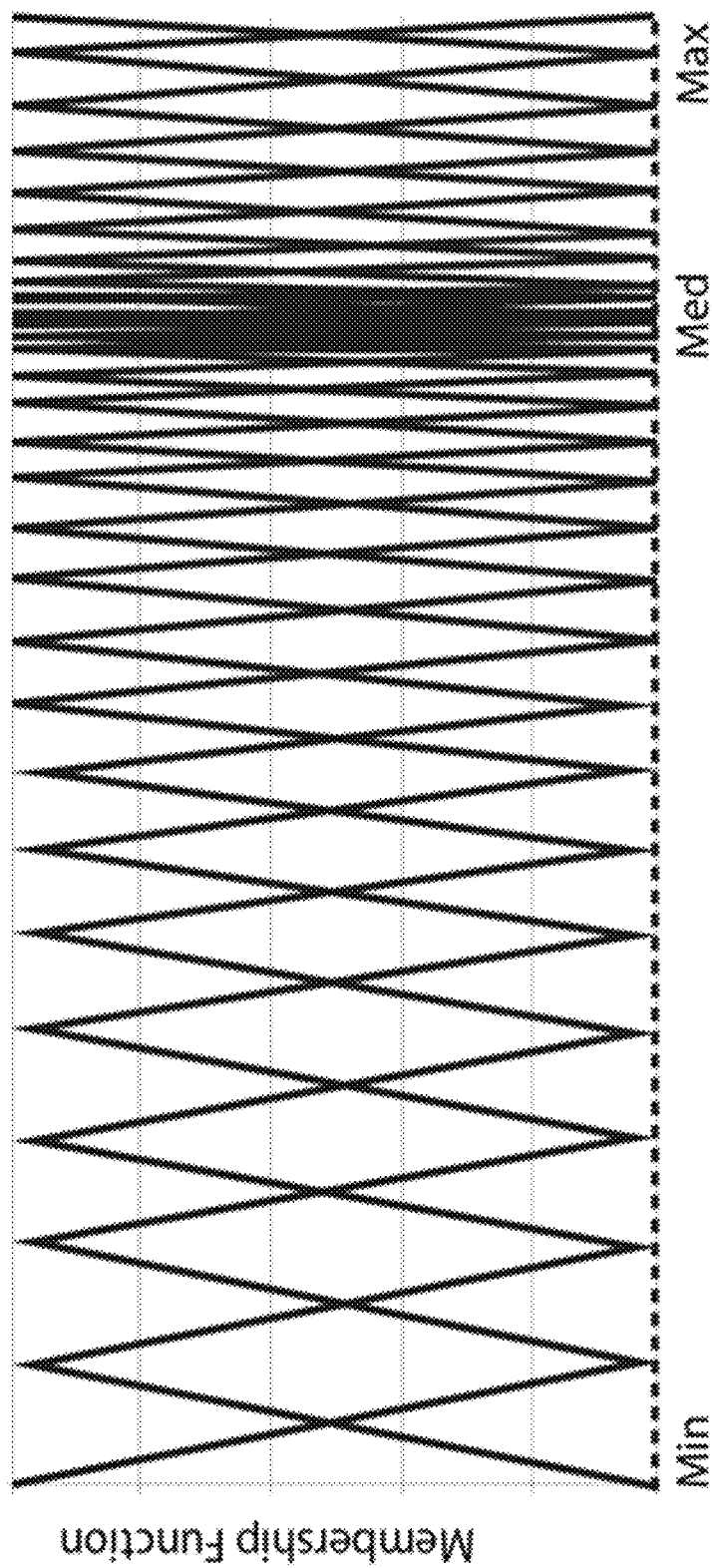
FIG. 4D is an illustration of fuzzy set using non-linearity value >0.

FIGS. 4B-4D described below show the differences between the membership functions for the configuration parameters of the example proposed, using different values for non-linearity of Fvn. FIG. 4B shows the shape of the membership functions for non-linearity of Fvn lower than 0. It is possible to notice that the area of the triangles is rapidly reduced as the approach the MedVn value. Around the MedVn value there is a large number of membership functions, generating high granularity and high resolution around this region. The asymmetry between the left side and the right side causes the area of the membership functions to be reduced more rapidly on the right side than on the left side.

It is possible to generate a linear distribution of the membership functions by only dividing the speech universe (fuzzy set interval) by the desired number of the membership functions. The machine proposed in this innovation decides automatically the number of membership functions with respect to the speech universe as shown in FIG. 4C. The number of membership functions follows the same model for nonlinear <0 and non-linearity >0. The latter aims at keeping a balance between the granularity necessary for high resolution in the mapping of the speech universe and the time for the resolution of this linguistic variable. The number of membership functions may be different for each linguistic variable and the number of membership functions on the left side of the speech universe (below the equilibrium point value of this linguistic variable) may be different from the number on the right side.

With the increase in the non-linearity value, the granularity increases in values away from the MedVn. This effect can be verified in FIG. 4D. More dispersed granularity means a distribution of importance of all the values of the speech universe (to the detriment of a high concentration around the MedVn value, as shown in FIG. 4B).

After automatic distribution of the membership functions into fuzzy sets, with the desired granularity, observing the speech universe of all the variables, it is the moment of forming the base rules of the fuzzy knowledge coupled to the inputs of the controller at its outputs.

The previous component has created all the fuzzy sets of the variables selected as shown in FIGS. 4B, 4C, and 4D. The first phase of the multiplexing component is to separate the reading variables from the writing variables (or input variables from output variables). The Information used for this separation was inserted into the component Input Variables 100, information IN/OUT. In case its value is high, this will be an input of the controller and if its value is low, this will be an output.

After separation of the controller variables into two groups of variables, input and output groups, this is the moment of forming the fuzzy rules that will compose the knowledge base of the fuzzy controller. For each reading variable, the information DIR/REV supplied to the component Input Variables 100 will be evaluated. If the signal configured for DIR/REV is high, the direction between writing variable and reading variable will be direct, that is to say, low values for input variable will imply lower values for the output variable. If the signal configured for DIR/REV is low, the direction between the writing variable and the reading variable will be reverse, that is to say, low values for input variable will imply higher values for the output variable. If your translate this information to the formation of fuzzy rules, linking between the membership functions of the reading and writing variables means that, in the direct direction, the initial membership functions of the reading variable should be linked to the initial membership functions of the writing variables. On the other hand, in the reverse direction, the initial membership functions of the reading variable are linked to the final variables of the writing variable, as shown in FIG. 5.

Figure 5:
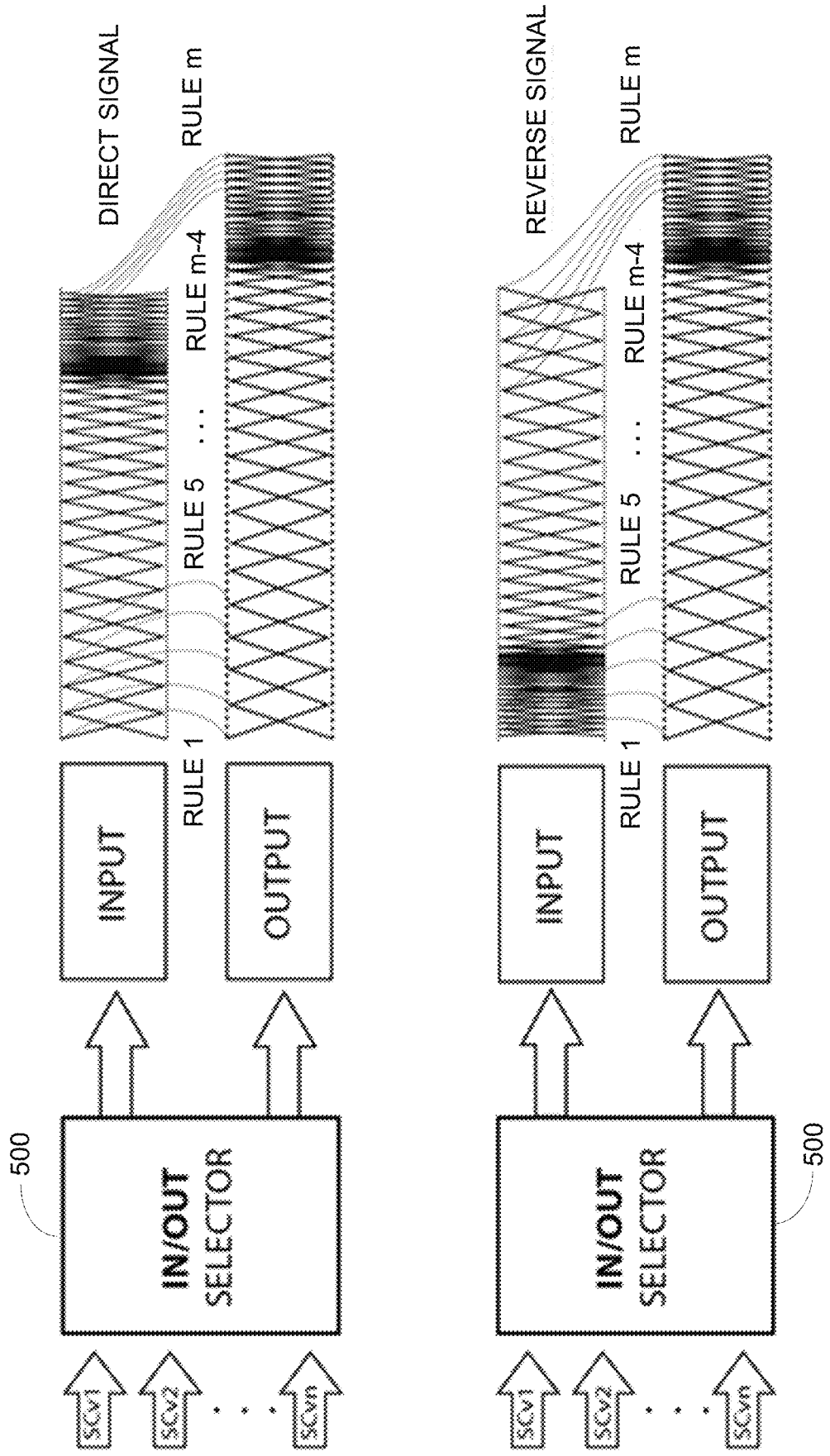
FIG. 5 is an illustration of formation of the fuzzy rules, direct and reverse examples.

It is to verify in FIG. 5 that the order of the membership functions of the reading variables in the direct direction (upper example) is reversed with respect to the example in the reverse direction (lower example).

The physical effect between the direct or reverse distribution is when the value of a reading variable increases, the value of the writing variable increases (if the direction is direct). If the direction is reverse, when the value of a reading variable increases, the value of the writing variable decreases.

The output of the Multiplex or IN/OUT Selector component 500 represents a strategy of complete fuzzy (CF) advanced process control with multiple inputs and multiple outputs of simple configuration by the user.

Figure 6:
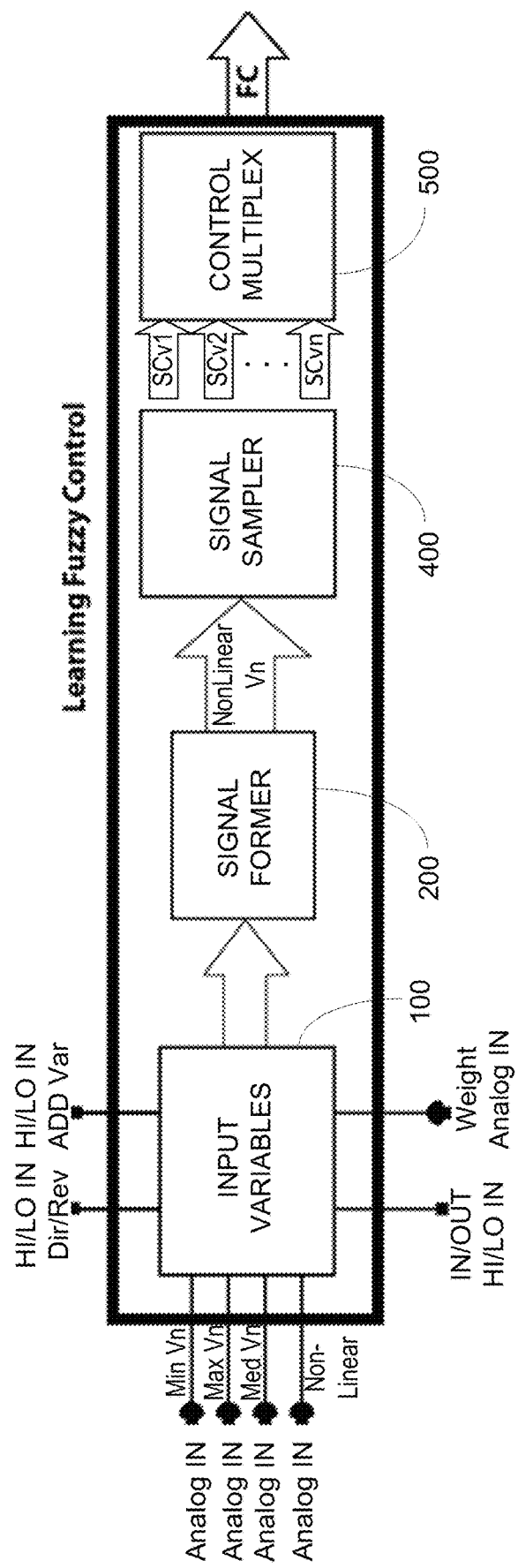
FIG. 6 is an illustration of a machine for automatic generation of fuzzy knowledge base controller.

The complete machine can be conceived according to the illustration shown in FIG. 6. As can be seen, there are only five analogical configurations and two digital ones for each fuzzy controller variable. The later components are responsible for treating the configurations, creating the membership functions and relating them to fuzzy rules, thus generating a knowledge base usable by a standard fuzzy interpreter, as the FCL.

Present-day industrial processes produce considerably more information than are actually used by the automatic process controllers. Hereinafter one presents three practical applications, where the utilization of Learning Fuzzy Control enabled one to use more of the information made available by the sensors, increasing the efficiency of the process.

Example one: a system for co-generation of energy fed with steam from gas- and biomass-operated boilers. The traditional automated controllers (PID) limit themselves to keeping the pressure of each individual boiler stable and keeping the energy generation load of the turbines. It depends upon the manufacture processes and upon feeding fuel to the boilers, preventing a too great drop in pressure. The control system applied through the Learning Fuzzy Control monitors the following variables: pressure of each boiler, pressure of overall steam, temperature of each furnace, flow of steam of the processes, flow of vapor generated by each boiler, the controller deciding what should be the energy flow to the boilers (gas or biomass). The larger number of monitored variables with respect to the traditional control strategy virtually eliminated the need from intervention of the operator, because the control system anticipates the disturbances and acts preventively in feeding fuel, besides reducing the consumption of gas by 6%, since it favors the biomass boiler, which is more cost-saving, to the detriment of gas boilers. The variation in the steam pressure was reduced by 30%. If the client installs a humidity sensor on the biomass boiler, the performance of the controller would be even higher. The client does not have a history of the reading variables (pressure of each boiler, overall steam pressure, temperature of each furnace, steam flow of the processes, flow of steam generated by each boiler), which makes the training of a fuzzy controller through the data unfeasible. A multivariable fuzzy controller developed manually should have at least five triangular membership functions for each reading variable and one singleton for writing variable. Therefore, eight reading variable (four for each boiler), plus the overall steam pressure generate nine reading variables. Considering the two reading variables with 5 singletons each, they generate 450 (45 membership functions multiplied by 10 reading singletons) rules for complete mapping of the knowledge base. Besides the intense work involved in tuning in the 45 membership functions and the 450 weights (one for each rule), the small number of membership functions increase the tuning-in challenge due to the low resolution of the linguistic variable. The increase in the membership functions contributes to the increment of the robustness of the fuzzy controller.

Description for practical obtainment of the fuzzy controller for a boiler described in the first example:

1) The reading variables (INPUTS) were: boiler pressure and vapor flow. The only writing variable (OUTPUT) was the energy flow into the boiler (biomass or gas).

2) For each variable it is necessary to define which operation is desired, informing the minimum value (MinVn), maximum value (MaxVn), and the medium value (MedVn). At this moment, one also defines the direction between the reading and the writing variables (Dir/Ver) and weight (Weight) of each reading variable on the writing variables.

2.1) The minimum value (MinVn) for the boiler pressure was defined at 43 kgf/cm$^2$, the maximum value at 46 kgf/cm$^2$, the medium value (MedVn), in this case the setpoint, at 44.5 kgf/cm$^2$ and the direction as reverse (Rev). The weight (Weight) proposed for the boiler pressure was 95%.

2.2) The minimum value (MinVn) for each vapor flow was defined at 65 t/h, the maximum value at 80 t/h, the medium value (MedVn) at 75 t/h and the direction as direct (Dir). The weight (Weight) proposed for the flow vapor flow was 55%.

2.3) The minimum value (MinVn) for the energy flow was defined at 5%, the maximum value at 80%, the medium value (MedVn) at 40%. It is not necessary to define the direction of the Outputs.

Figure 7:
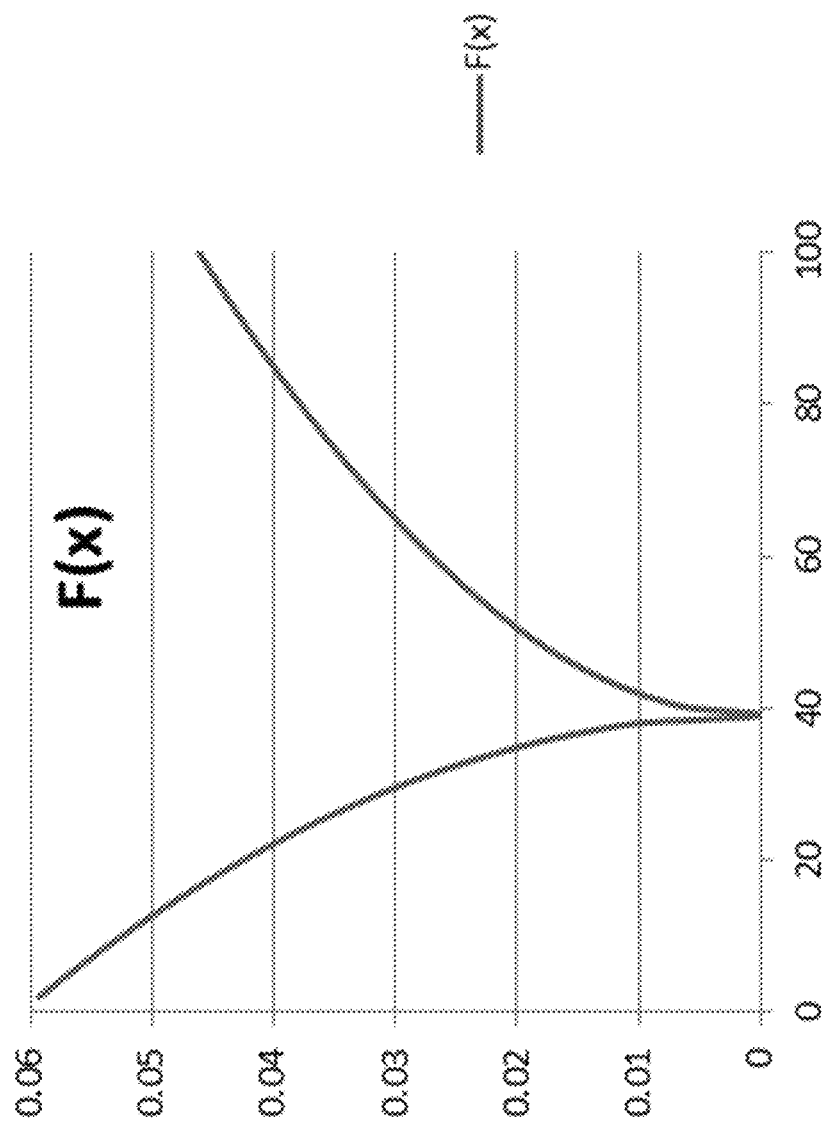
FIG. 7 is the curve generated for Boiler pressure with NonLinear parameter equal to 0.000065 for the described specific embodiment.

3) The final tuning values will now be presented, the NonLinear values and the weights obtained by evaluating the behavior of the controller with the boiler. FVn(x) curves entered by the Signal Former signal are:

3.1) Boiler pressure with NonLinear parameter is equal to 0.000065. The curve generated is shown in FIG. 7.

Figure 8:
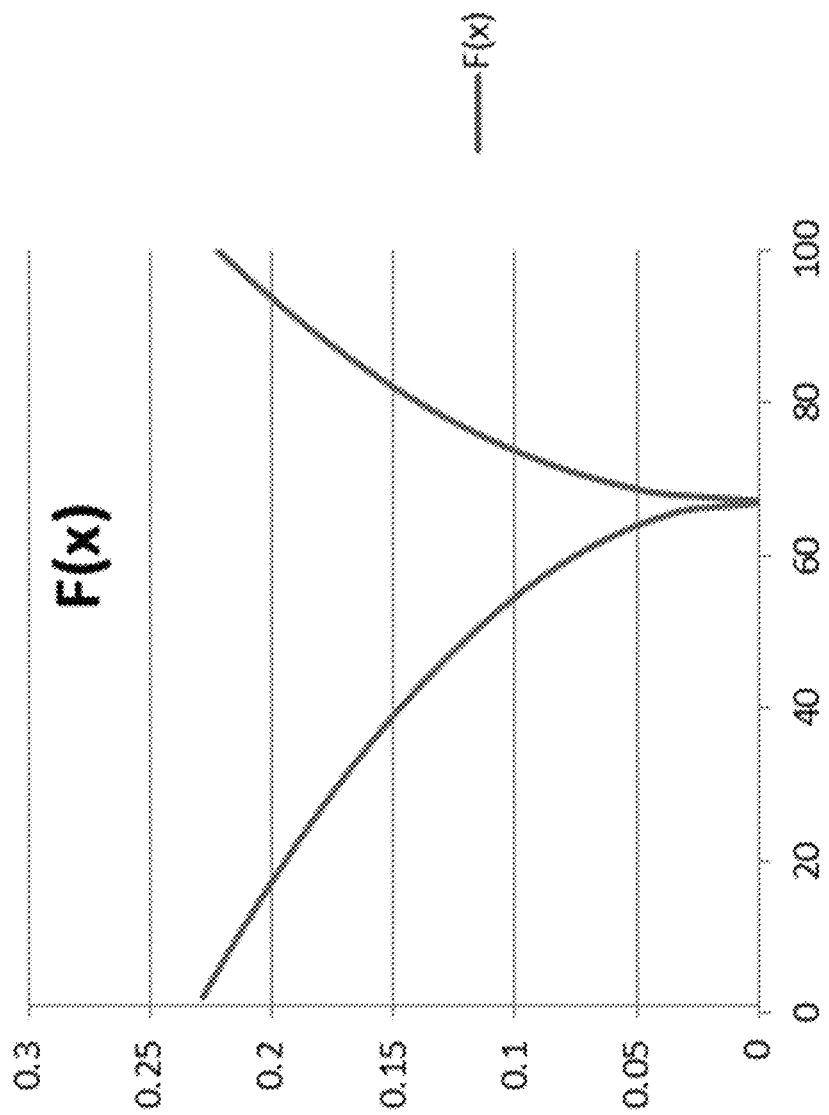
FIG. 8 is the curve generated for Vapor flow with Non-Linear parameter equal to 0.001152 for the described specific embodiment.

3.2) Vapor flow with NonLinear parameter is equal to 0.001152. The curve generated is shown in FIG. 8.

Figure 9:
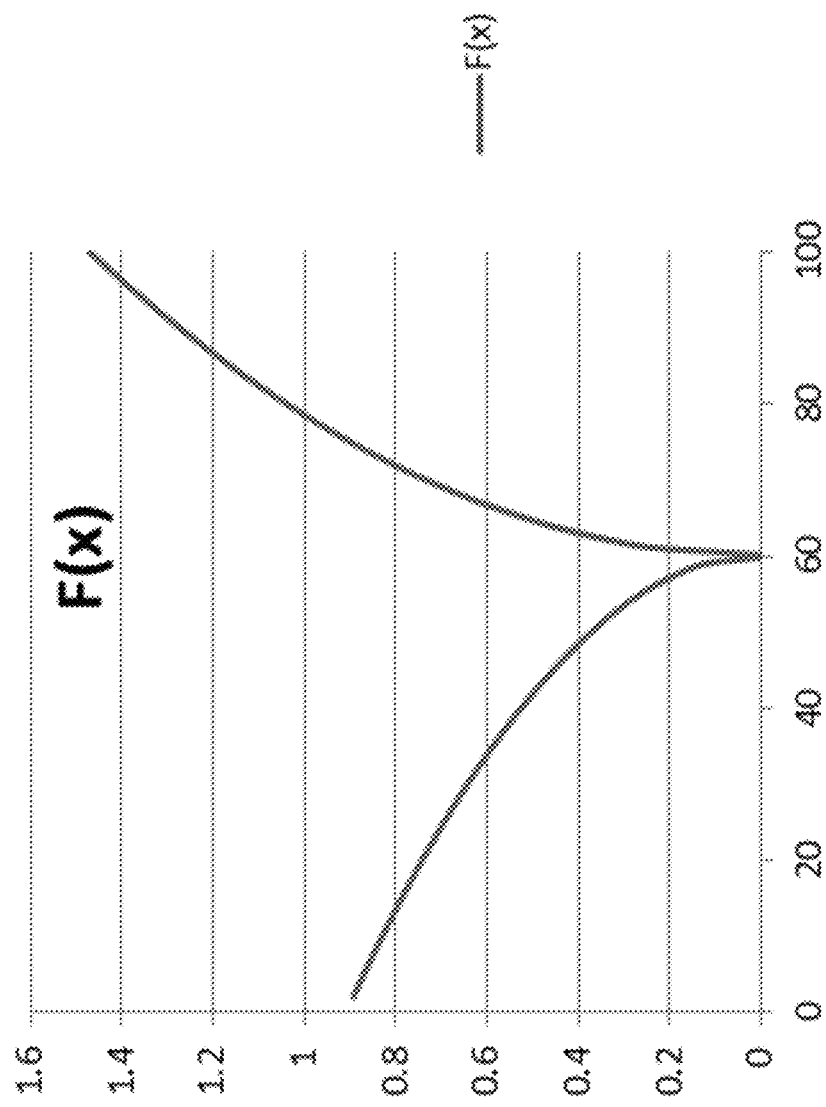
FIG. 9 is the curve generated for Energy flow with NonLinear parameter equal to 0.033975 for the described specific embodiment.

3.3) Energy flow with NonLinear parameter is equal to 0.033975. The curve generated is shown in FIG. 9.

4) The curves presented in 3) are sampled to define the bases of the pertinence functions that will compose the fuzzy sets of each variable. The samplings for each variable carried out by the Signal Sampler are provided in Table 1.

TABLE 1

| Boiler Pressure | | Vapor Flow | | Energy Flow | |
| --- | --- | --- | --- | --- | --- |
| Iteration | Value | Iteration | Value | Iteration | Value |
| 1 | 0.0593 | 1 | 0.2285 | 1 | 0.8930 |
| 2 | 0.0585 | 2 | 0.2267 | 2 | 0.8853 |
| 3 | 0.0577 | 3 | 0.2249 | 3 | 0.8775 |
| 4 | 0.0568 | 4 | 0.2231 | 4 | 0.8696 |
| 5 | 0.0560 | 5 | 0.2213 | 5 | 0.8617 |
| 6 | 0.0551 | 6 | 0.2195 | 6 | 0.8537 |
| 7 | 0.0543 | 7 | 0.2177 | 7 | 0.8456 |
| 8 | 0.0534 | 8 | 0.2158 | 8 | 0.8374 |
| 9 | 0.0525 | 9 | 0.2139 | 9 | 0.8292 |
| 10 | 0.0516 | 10 | 0.2121 | 10 | 0.8208 |
| 11 | 0.0506 | 11 | 0.2102 | 11 | 0.8124 |
| 12 | 0.0497 | 12 | 0.2082 | 12 | 0.8039 |
| 13 | 0.0487 | 13 | 0.2063 | 13 | 0.7953 |
| 14 | 0.0477 | 14 | 0.2043 | 14 | 0.7866 |
| 15 | 0.0467 | 15 | 0.2024 | 15 | 0.7778 |
| 16 | 0.0457 | 16 | 0.2004 | 16 | 0.7689 |
| 17 | 0.0447 | 17 | 0.1984 | 17 | 0.7599 |
| 18 | 0.0436 | 18 | 0.1963 | 18 | 0.7508 |
| 19 | 0.0425 | 19 | 0.1943 | 19 | 0.7416 |
| 20 | 0.0414 | 20 | 0.1922 | 20 | 0.7323 |
| 21 | 0.0402 | 21 | 0.1901 | 21 | 0.7228 |
| 22 | 0.0390 | 22 | 0.1880 | 22 | 0.7133 |
| 23 | 0.0377 | 23 | 0.1858 | 23 | 0.7036 |
| 24 | 0.0365 | 24 | 0.1836 | 24 | 0.6937 |
| 25 | 0.0351 | 25 | 0.1814 | 25 | 0.6837 |
| 26 | 0.0338 | 26 | 0.1792 | 26 | 0.6736 |
| 27 | 0.0323 | 27 | 0.1770 | 27 | 0.6633 |
| 28 | 0.0308 | 28 | 0.1747 | 28 | 0.6529 |
| 29 | 0.0292 | 29 | 0.1724 | 29 | 0.6423 |
| 30 | 0.0276 | 30 | 0.1700 | 30 | 0.6315 |
| 31 | 0.0258 | 31 | 0.1676 | 31 | 0.6205 |
| 32 | 0.0239 | 32 | 0.1652 | 32 | 0.6093 |
| 33 | 0.0218 | 33 | 0.1628 | 33 | 0.5979 |
| 34 | 0.0195 | 34 | 0.1603 | 34 | 0.5863 |
| 35 | 0.0169 | 35 | 0.1578 | 35 | 0.5745 |
| 36 | 0.0138 | 36 | 0.1552 | 36 | 0.5624 |
| 37 | 0.0097 | 37 | 0.1526 | 37 | 0.5500 |
| 38 | 0.0000 | 38 | 0.1499 | 38 | 0.5374 |
| 39 | 0.0059 | 39 | 0.1472 | 39 | 0.5244 |
| 40 | 0.0084 | 40 | 0.1445 | 40 | 0.5111 |
| 41 | 0.0102 | 41 | 0.1417 | 41 | 0.4975 |
| 42 | 0.0118 | 42 | 0.1388 | 42 | 0.4835 |
| 43 | 0.0132 | 43 | 0.1359 | 43 | 0.4690 |
| 44 | 0.0145 | 44 | 0.1329 | 44 | 0.4541 |
| 45 | 0.0157 | 45 | 0.1299 | 45 | 0.4387 |
| 46 | 0.0167 | 46 | 0.1267 | 46 | 0.4228 |

TABLE 1-continued

| Boiler Pressure | | Vapor Flow | | Energy Flow | |
|---|---|---|---|---|---|
| Iteration | Value | Iteration | Value | Iteration | Value |
| 47 | 0.0177 | 47 | 0.1235 | 47 | 0.4062 |
| 48 | 0.0187 | 48 | 0.1202 | 48 | 0.3889 |
| 49 | 0.0196 | 49 | 0.1168 | 49 | 0.3708 |
| 50 | 0.0205 | 50 | 0.1133 | 50 | 0.3518 |
| 51 | 0.0213 | 51 | 0.1097 | 51 | 0.3317 |
| 52 | 0.0221 | 52 | 0.1060 | 52 | 0.3102 |
| 53 | 0.0229 | 53 | 0.1022 | 53 | 0.2872 |
| 54 | 0.0237 | 54 | 0.0982 | 54 | 0.2622 |
| 55 | 0.0244 | 55 | 0.0940 | 55 | 0.2345 |
| 56 | 0.0251 | 56 | 0.0896 | 56 | 0.2031 |
| 57 | 0.0258 | 57 | 0.0850 | 57 | 0.1658 |
| 58 | 0.0265 | 58 | 0.0801 | 58 | 0.1173 |
| 59 | 0.0271 | 59 | 0.0750 | 59 | 0.0000 |
| 60 | 0.0277 | 60 | 0.0694 | 60 | 0.2328 |
| 61 | 0.0284 | 61 | 0.0634 | 61 | 0.3292 |
| 62 | 0.0290 | 62 | 0.0567 | 62 | 0.4032 |
| 63 | 0.0296 | 63 | 0.0491 | 63 | 0.4656 |
| 64 | 0.0302 | 64 | 0.0401 | 64 | 0.5206 |
| 65 | 0.0307 | 65 | 0.0283 | 65 | 0.5703 |
| 66 | 0.0313 | 66 | 0.0000 | 66 | 0.6160 |
| 67 | 0.0319 | 67 | 0.0387 | 67 | 0.6585 |
| 68 | 0.0324 | 68 | 0.0548 | 68 | 0.6984 |
| 69 | 0.0329 | 69 | 0.0671 | 69 | 0.7362 |
| 70 | 0.0335 | 70 | 0.0775 | 70 | 0.7721 |
| 71 | 0.0340 | 71 | 0.0866 | 71 | 0.8065 |
| 72 | 0.0345 | 72 | 0.0949 | 72 | 0.8394 |
| 73 | 0.0350 | 73 | 0.1025 | 73 | 0.8711 |
| 74 | 0.0355 | 74 | 0.1095 | 74 | 0.9017 |
| 75 | 0.0360 | 75 | 0.1162 | 75 | 0.9312 |
| 76 | 0.0365 | 76 | 0.1225 | 76 | 0.9599 |
| 77 | 0.0369 | 77 | 0.1285 | 77 | 0.9877 |
| 78 | 0.0374 | 78 | 0.1342 | 78 | 1.0148 |
| 79 | 0.0379 | 79 | 0.1396 | 79 | 1.0412 |
| 80 | 0.0383 | 80 | 0.1449 | 80 | 1.0669 |
| 81 | 0.0388 | 81 | 0.1500 | 81 | 1.0920 |
| 82 | 0.0392 | 82 | 0.1549 | 82 | 1.1165 |
| 83 | 0.0397 | 83 | 0.1597 | 83 | 1.1405 |
| 84 | 0.0401 | 84 | 0.1643 | 84 | 1.1640 |
| 85 | 0.0406 | 85 | 0.1688 | 85 | 1.1871 |
| 86 | 0.0410 | 86 | 0.1732 | 86 | 1.2097 |
| 87 | 0.0414 | 87 | 0.1775 | 87 | 1.2319 |
| 88 | 0.0418 | 88 | 0.1817 | 88 | 1.2537 |
| 89 | 0.0422 | 89 | 0.1857 | 89 | 1.2751 |
| 90 | 0.0427 | 90 | 0.1897 | 90 | 1.2962 |
| 91 | 0.0431 | 91 | 0.1936 | 91 | 1.3170 |
| 92 | 0.0435 | 92 | 0.1975 | 92 | 1.3374 |
| 93 | 0.0439 | 93 | 0.2012 | 93 | 1.3575 |
| 94 | 0.0443 | 94 | 0.2049 | 94 | 1.3773 |
| 95 | 0.0447 | 95 | 0.2086 | 95 | 1.3969 |
| 96 | 0.0451 | 96 | 0.2121 | 96 | 1.4161 |
| 97 | 0.0454 | 97 | 0.2156 | 97 | 1.4351 |
| 98 | 0.0458 | 98 | 0.2191 | 98 | 1.4539 |
| 99 | 0.0462 | 99 | 0.2225 | 99 | 1.4724 |

Figure 10:
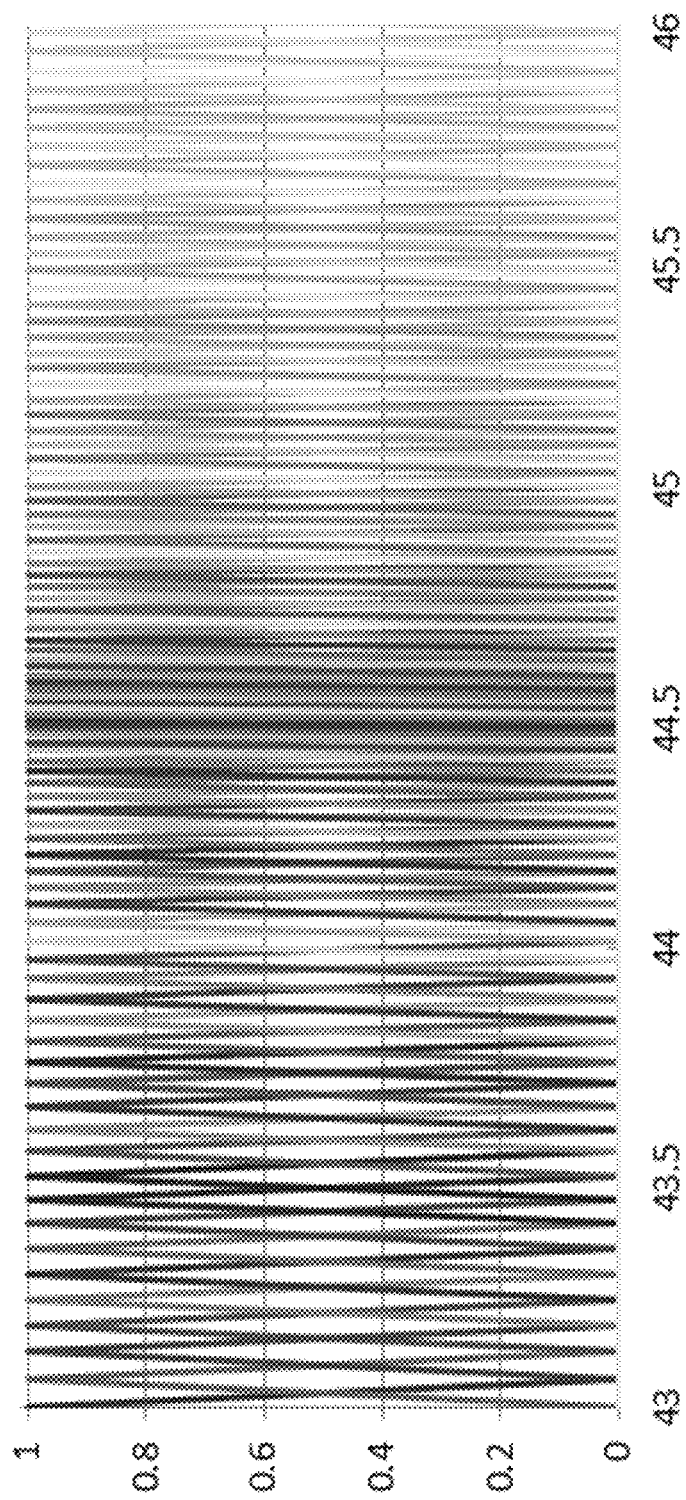
FIG. 10 is the fuzzy set of the boiler pressure for the described specific embodiment.
Figure 11:
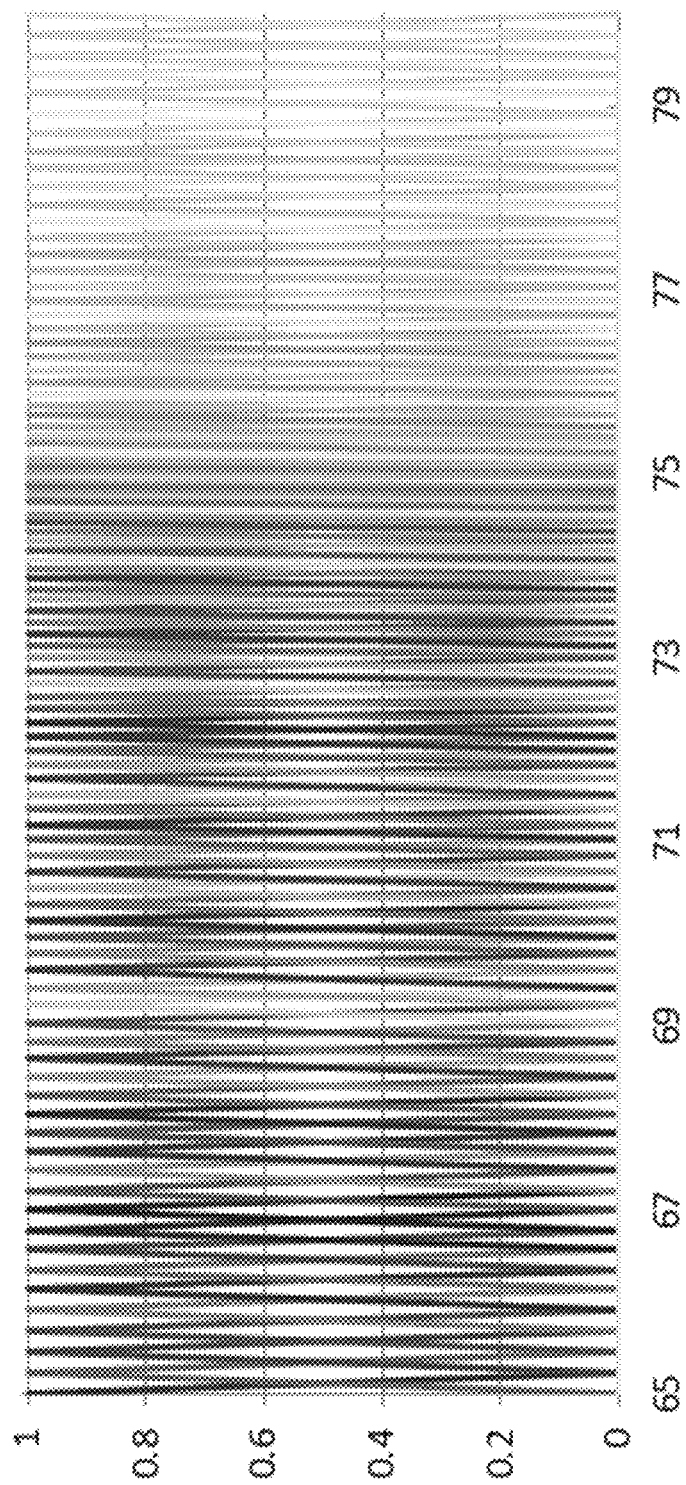
FIG. 11 is the fuzzy set of the vapor flow for the described specific embodiment.
Figure 12:
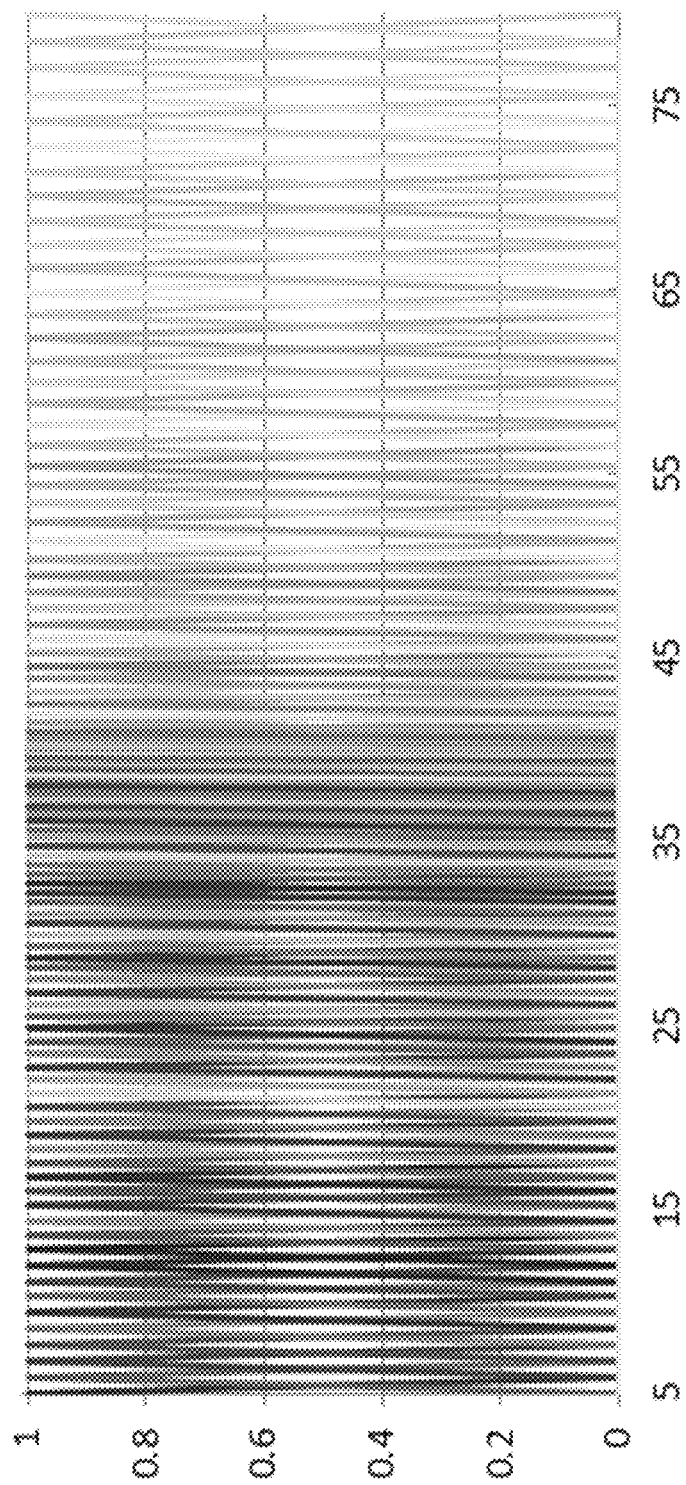
FIG. 12 is the fuzzy set of the energy flow for the described specific embodiment.

5) The values sampled in 4) are used to form the pertinence functions that compose the fuzzy sets carried out by the component Signal Sampler:

5.1) Fuzzy set of the boiler pressure is shown in FIG. 10.
5.2) Fuzzy set of the vapor flow is shown in FIG. 11.
5.3) Fuzzy set of the energy flow is shown in FIG. 12.

6) With the fuzzy sets defined in (4), the component Control Multiplex maps the INPUTS (boiler pressure and vapor flow) in the OUTPUTS (energy flow). The boiler pressure has reverse direction (Reverse) with respect to the energy flow, since the vapor flow has direct direction (Direct) with respect to the energy flow.

Figure 13:
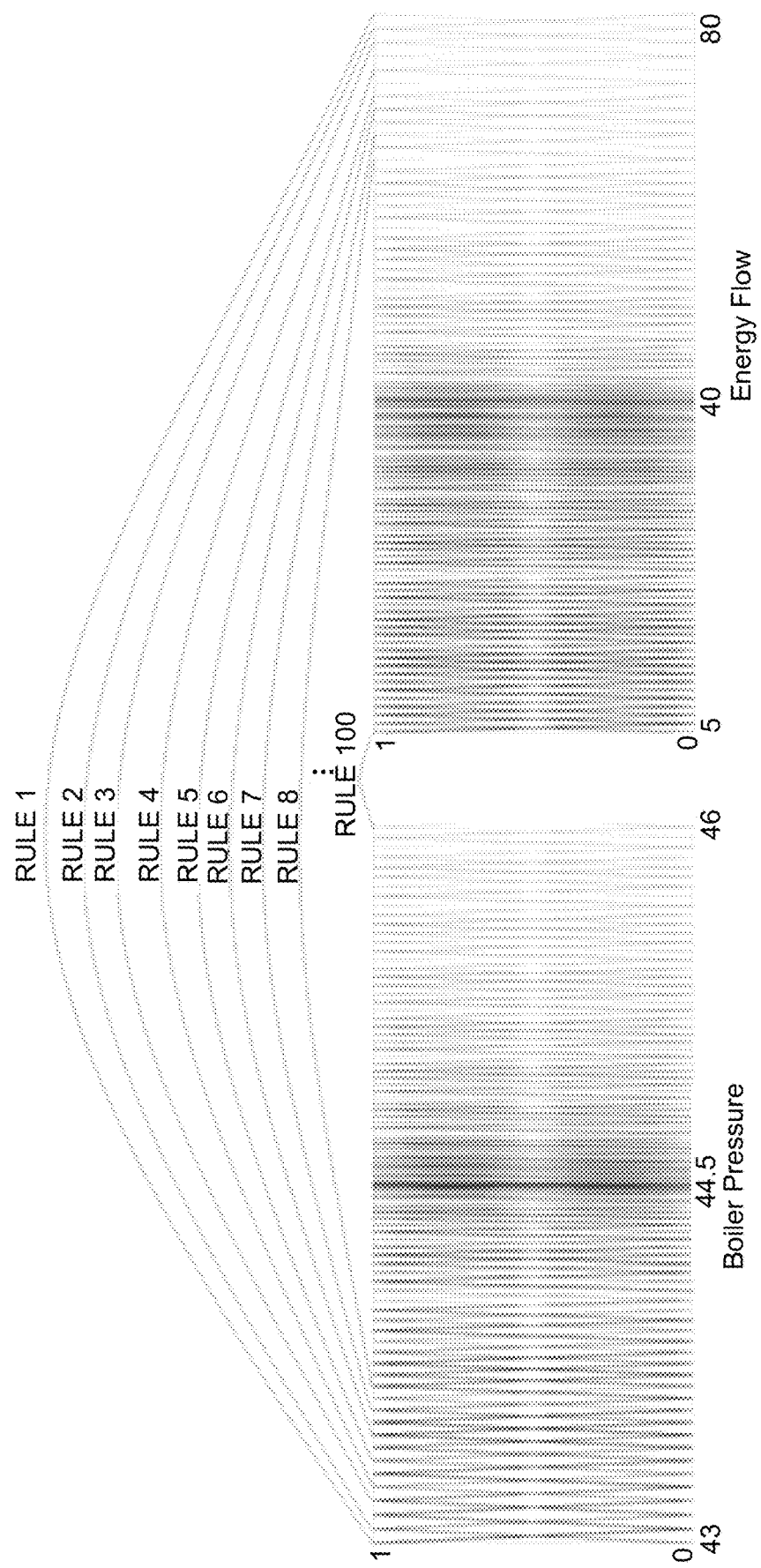
FIG. 13 is the mapping of the fuzzy rules between the boiler pressure and the energy flow (reverse direction) for the described specific embodiment.

6.1) Mapping of the fuzzy rules between the boiler pressure and the energy flow (reverse direction) is shown in FIG. 13.

Figure 14:
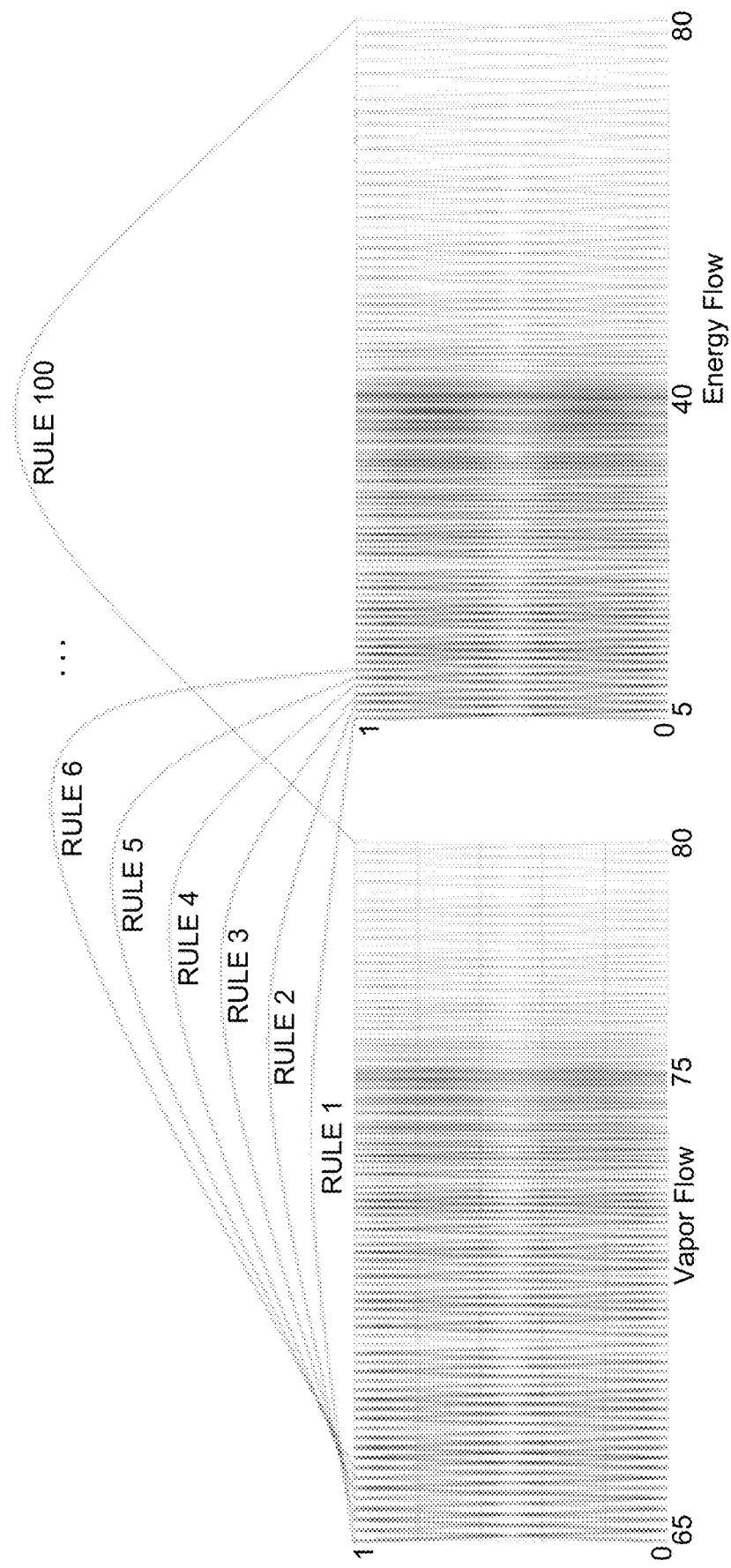
FIG. 14 is the mapping of the fuzzy rules between the vapor flowrate and the energy flow (direct direction) for the described specific embodiment.

6.2) Mapping of the fuzzy rules between the vapor flowrate and the energy flow (direct direction) is shown in FIG. 14.

7) With the fuzzy rule base mapped in (6), the equipment Learning Fuzzy Control completed the process automatic generation of fuzzy rules. The multivariable controller of industrial processes proposed in this example is available for execution by a fuzzy interpreting module. An example of module is the script interpreter proposed by the specification IEC61131-7, which defines the Fuzzy Control Language (FCL). A possible mapping of the controller generated by the Learning Fuzzy Control compatible with the specification IEC61131-7 is given in Table 2 (see incorporated Computer Program Listing Appendix).

Example two: application on aluminum digesters—The controlled variable (or process variable) is evaluated via laboratory tests, and the results thereof are made available every two hours. This fact makes a traditional application with the PID unfeasible. The aluminum content present in the bauxite varies during the day depending on where it has been extracted from. The control of these processes is under the responsibility of the operators, that is to say, it is in manual operation. The Learning Fuzzy Control enabled one to carry out the simultaneous evaluation of the online variables of paste flow-rate, bauxite flow-rate, density of caustic soda, in-flow of bauxite and temperature of the digester, besides the offline variables (with updating every two hours by the laboratory), like the content of caustics in the digester, contents of dissolved alumina, concentration of solids, alumina/caustics relation of the tank soda for writing the best paste flow-rate for the process at the moment. All the cited values are evaluated and considered in each control cycle with duration of 1 second. The application of the controller made the 100% manual process into a 100% automatic process, reduced by 50% the variability of the controlled variable and educed the consumption of steam by 3.2%. If bauxite-density sensors were implanted at the digester entrance, sensors for concentration of online alumina, sensor for alumina decanted in the subsequent process of the digester, the performance of the controller would be incremented. The nine reading variables and one writing variable of the controlled described, using the methodology of development of a manual controller presented in the preceding example, would require tuning in 225 rules. With an additional challenge, the offline variables are updated every two hours, which makes the tuning-in impracticable in due course.

Example three: ammonia absorption towers at a nickel plant—ammonia diluted in water at low concentration needs to be recovered for return to the process. This liquid was contaminated with various metals, so as to make the process and absorption difficult. The main challenge is that the operation of the absorption towers needs to be interrupted every 60 hours due to incrustation. Chemical or physical cleaning should be carried out to render the tower operative again. The controller implanted in this equipment, besides monitoring the sensitive temperature of the equipment (as a traditional PID controller), monitors the top temperature, the bottom temperature, top pressure, bottom pressure, feed flow, steam pressure of the facilities and steam flow-rate of the online boilers, the contamination of ammonia at the bottom is monitored via laboratory data updated every 4 hours. The controller descries the flow of feed of diluted ammonia and flow of steam to the absorption tower. With more variables being monitored, the Learning Fuzzy Control provided economy of 3.5% in the consumption of steam by the process, besides reducing the intervention of the operators in the start and shutdown maneuvers of the absorption towers. The eight reading variables and two writing variables of the controller described, using the methodology of development of a manual controller presented in the first example, would require tuning-in of 400 rules. In practical application, one implanted the Learning Fuzzy Control on six absorption towers, which would increase the number of rules to 2400. An effort that would require more than a year of a specialist was carried out by a technician in less than one month.

Figure 15:
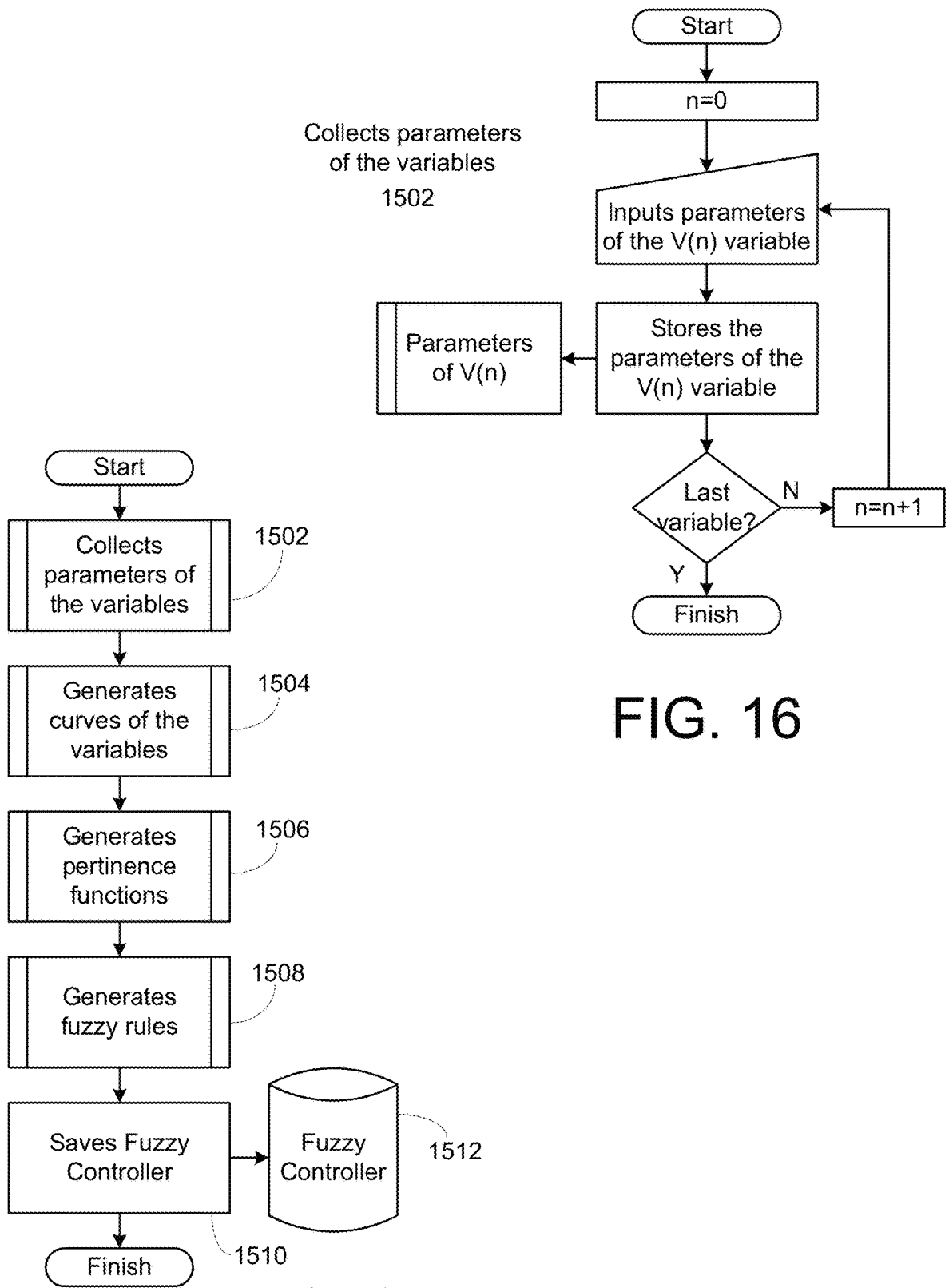
FIGS. 15-20 are flowcharts of operation according to the present invention to produce a fuzzy knowledge base.
Figure 16:
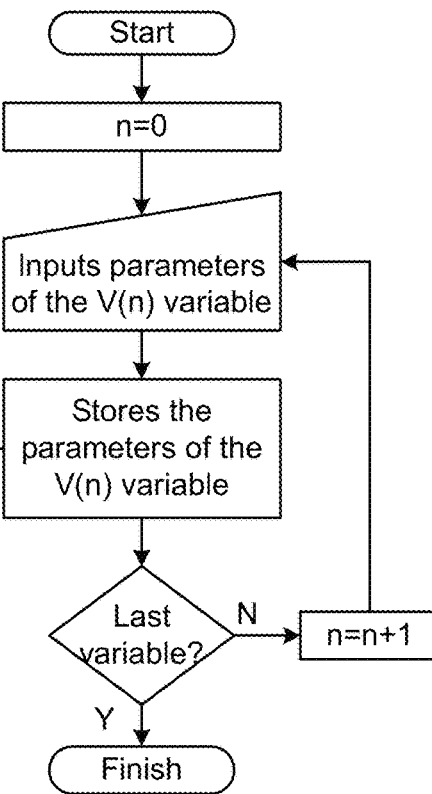
Figure 17:
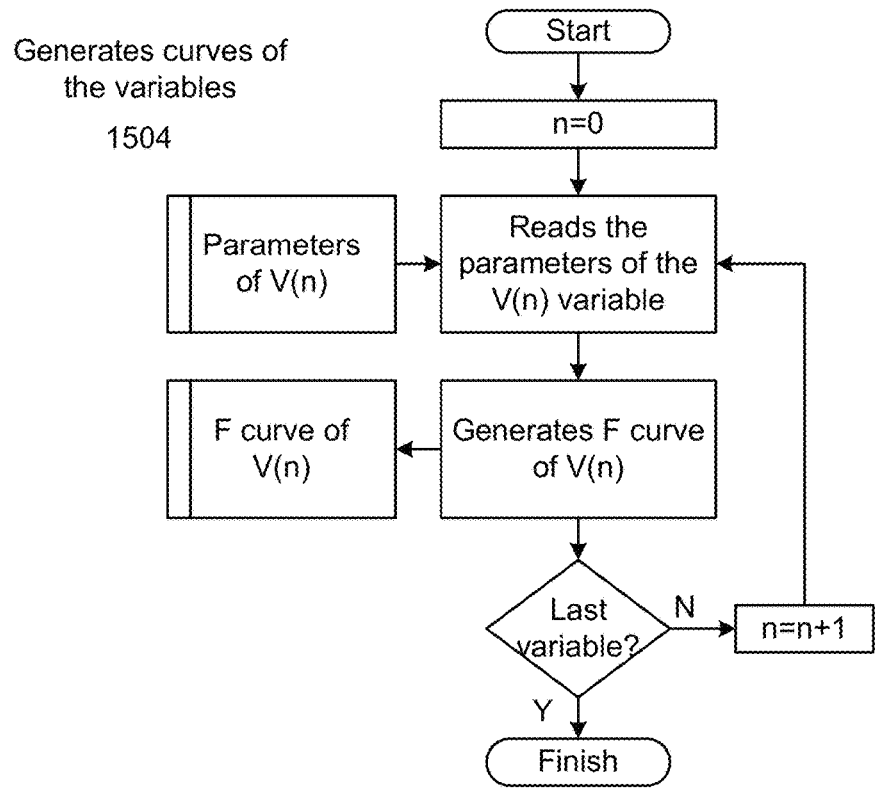
Figure 18:
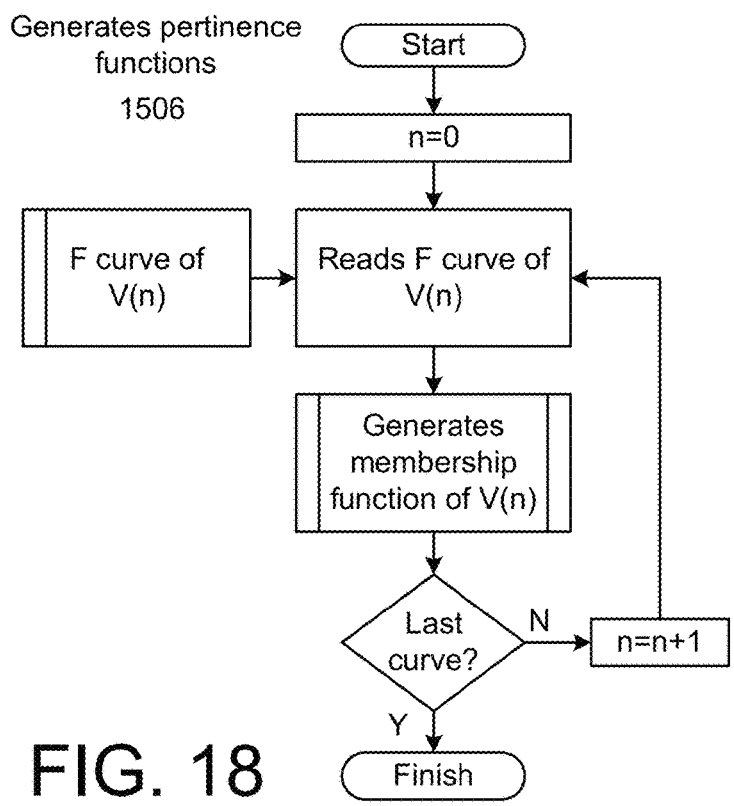
Figures 19, 21:
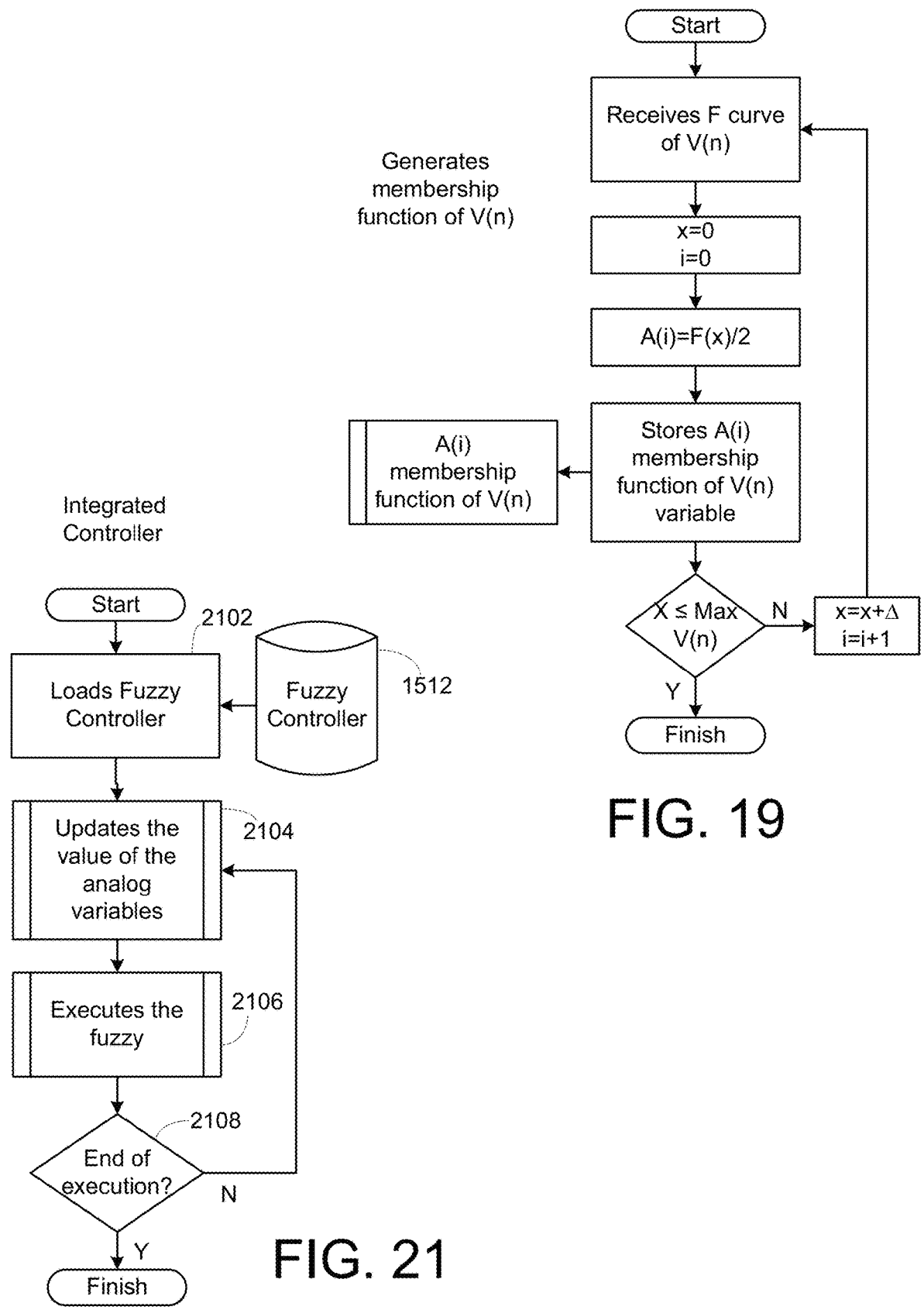
FIGS. 21-23 are flowcharts of operating a fuzzy controller using a fuzzy knowledge base developed according to FIGS. 15-20.
Figure 20:
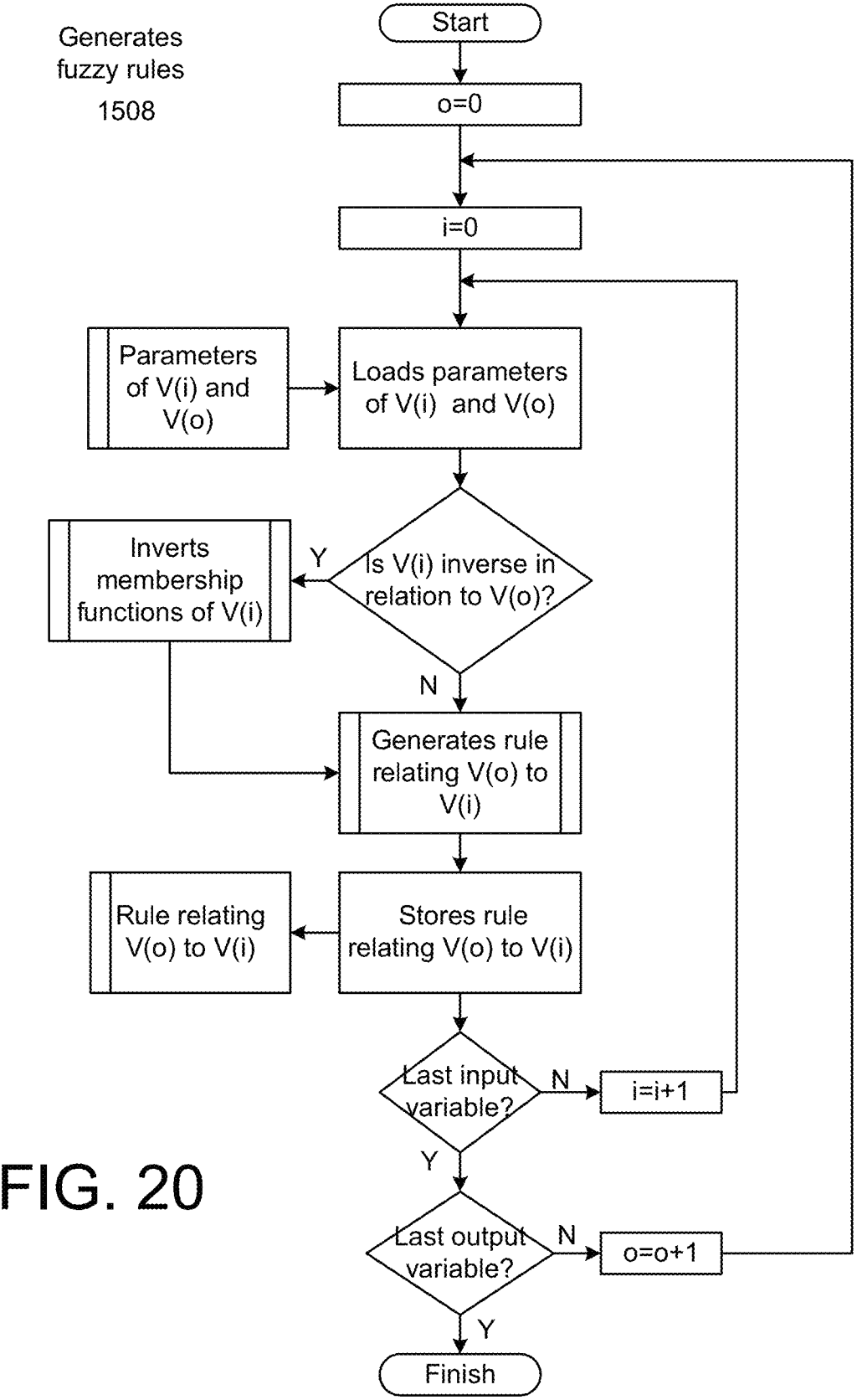

A flowchart of operation according to the present invention is shown in FIG. 15. In step 1502 the parameters of the variables is collected from the user as shown in FIG. 16. In step 504 the curves of the variables are generated as shown in FIG. 17. In step 1506 the pertinence functions are generated as shown in FIG. 18. The generates membership function of V(n) of FIG. 18 is shown in FIG. 19. In step 1508 the fuzzy rules are generated as shown in FIG. 20. In step 1510 the fuzzy controller, the fuzzy knowledge base rules developed as described above, are stored as a fuzzy controller 1512.

Figure 22:
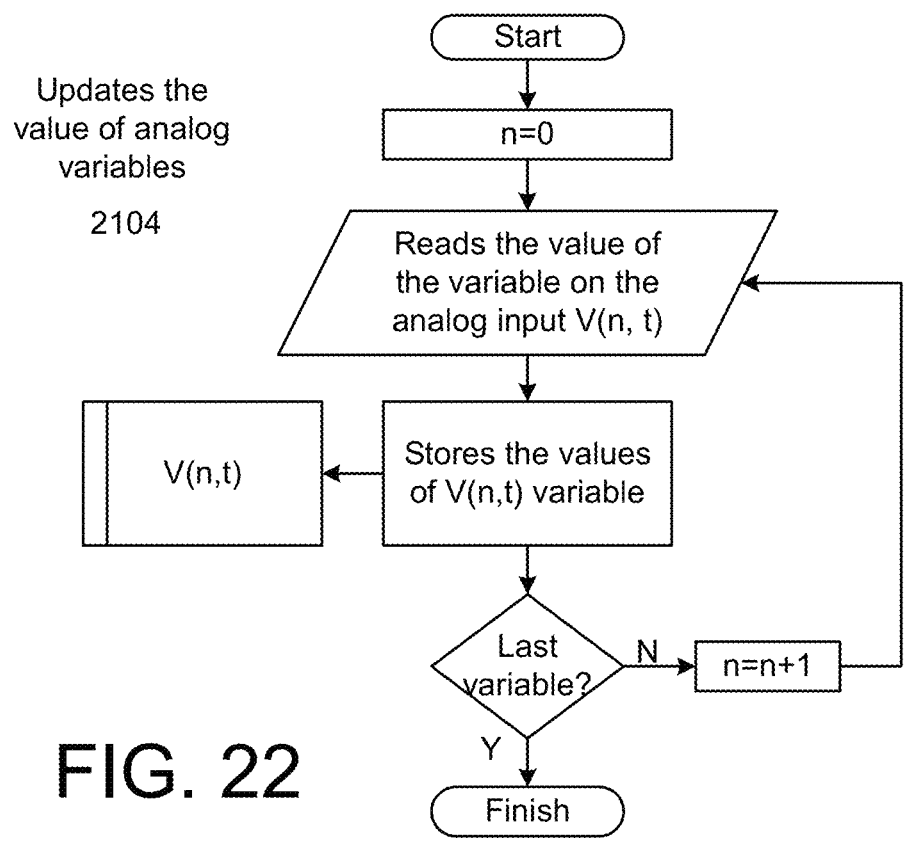
Figure 23:
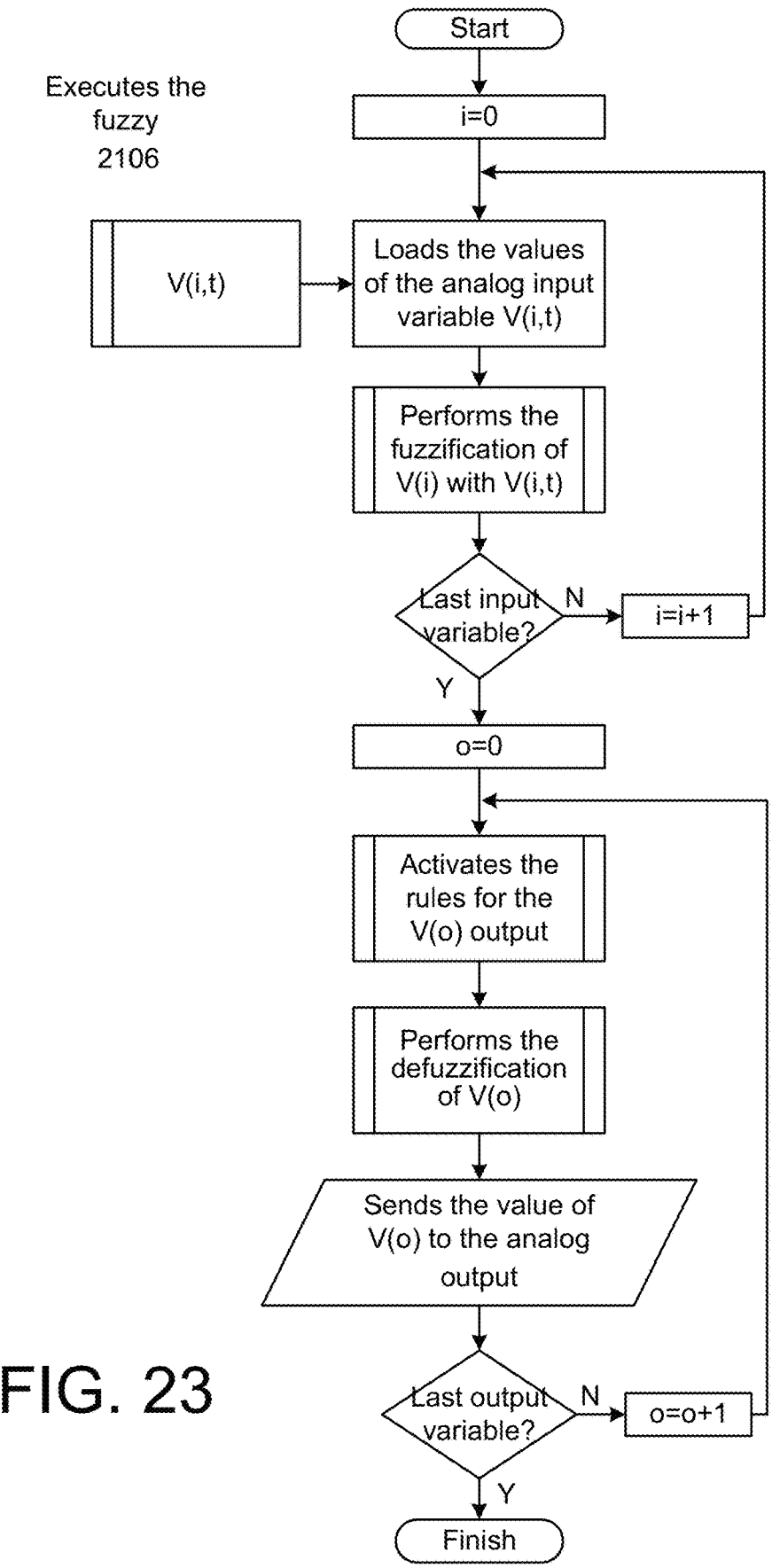

FIG. 21 is a flowchart of operations of an integrated fuzzy controller. In step 2102 the fuzzy controller or knowledge base 1512 is loaded. In step 2104 the analog values of the process being controlled are loaded as shown in FIG. 22. In step 2106 the fuzzy control is operated as shown in FIG. 23, which includes providing the desired output variable value. In step 2108 if execution is not finished, operation returns to step 2104 for continued process control.

Figure 24:
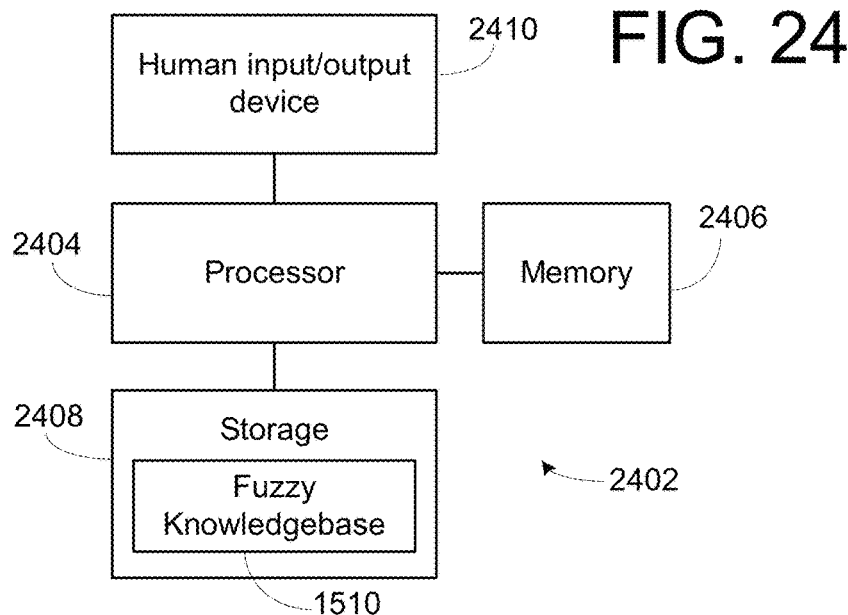
FIG. 24 is a block diagram of a computer for performing the flowcharts of FIGS. 15-20.

A computer, such as the computer 2402 shown in FIG. 24 may be used to generate the fuzzy knowledge base according to the present invention. The computer 2402 includes a processor 2404, a memory 2406 for holding programs and data while operating, storage 2408 for storing the software programs used to operate the computer 2402 and the fuzzy knowledge base or controller 1510 and a human input/output device 2410 for receiving the variable values.

Figure 25:
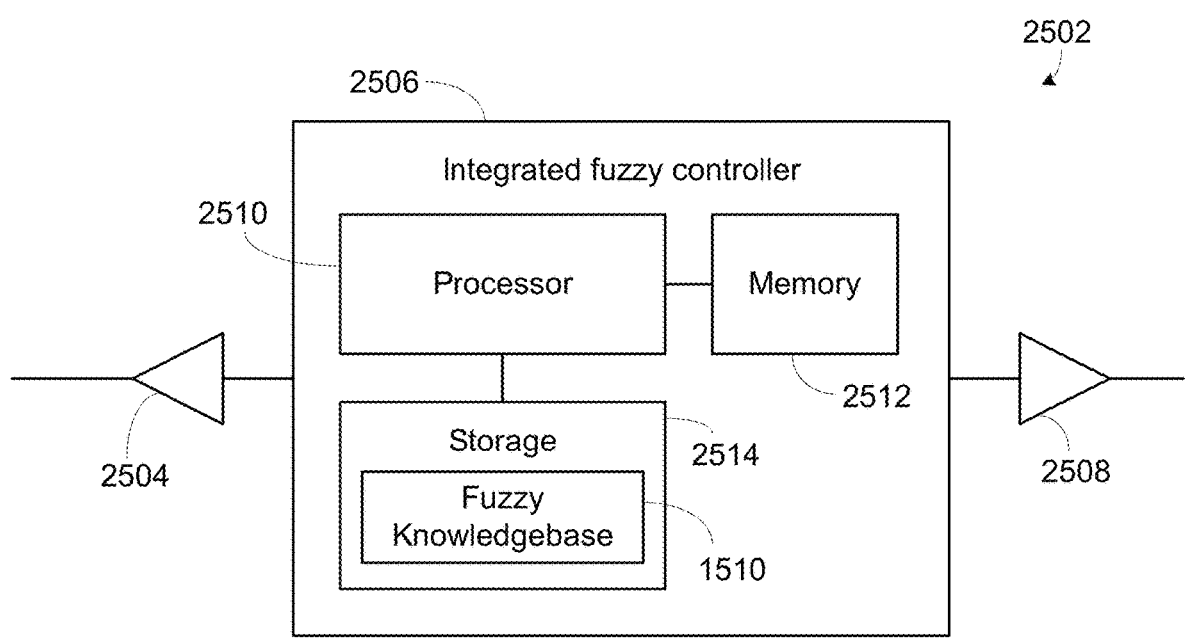
FIG. 25 is a block diagram of an integrated fuzzy controller for performing the flowcharts of FIGS. 21-23.

A fuzzy controller 2502 as would be used in a process such as those described above is shown in FIG. 25. An analog-to-digital converter 2504 provides the input signals to an integrated fuzzy controller 2506, a computer configured to receive the process inputs, operate on those inputs using the fuzzy knowledge base and provide the determined output. A digital-to-analog converter 2508 receives the output signal from the integrated fuzzy controller 2506 and converts the digital value to an analog value used control the process. The integrated fuzzy controller 2506 includes a processor 2510 to receive the digital input signals and provide digital output signals, a memory 2512 and storage 2514, which includes the fuzzy knowledge base 1510 used to control the process. This is highly simplified block diagram and other configurations as known to those skilled in the art can control process using the developed fuzzy knowledge base, such as controllers which can be programmed according to IEC Rule no 61131-7.

It is understood that the fuzzy controller 2502 could also be used to develop the fuzzy knowledge base if the software as described above and a way to receive the variable information is provided.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

The invention claimed is:

1. A method of generating a fuzzy knowledge base for a programmable fuzzy controller used to control a process without the use of a database of historical values of relevant input variables, the method comprising the steps of:
    receiving values of relevant input variables and output variables, including non-linearity values indicating linearity degree, to be controlled from a user without the use of a database of historical values of relevant input variables;
    creating artificial potential fields for each of said relevant input variables and output variables;
    sampling each of said potential fields and automatically generating fuzzy membership functions from such sampling;
    choosing a number of membership functions from the generated fuzzy membership functions to provide a linearity degree received from the user;
    compiling the chosen fuzzy membership functions into fuzzy sets; and
    mapping the fuzzy sets from relevant input variables to output variables to automatically create fuzzy rules, said fuzzy rules forming the fuzzy knowledge base.

2. The method according to claim 1, wherein the step of receiving the relevant input variables and output variables from a user without the use of a database of historical values of relevant input variables includes, for each variable, receiving:
    minimum, maximum, and equilibrium values;
    an importance weight;
    a non-linearity value;
    a control direction; and
    information as to whether said variable is an input variable or output variable.

3. The method according to claim 1, wherein the step of creating artificial potential fields includes, for each variable received from the user, deriving a function that generates a linear potential field based on said relevant input and output variables, wherein the potential field has its own minimum value at an equilibrium value of each variable.

4. The method according to claim 1, wherein the step of sampling each of said potential fields includes the steps of:
    sampling automatically each potential field in small increments of value; and
    generating a fuzzy membership function for each small increment sampled, wherein an area of the membership function is proportional to the sampled potential field value.

5. The method according to claim 1, wherein the step of compiling the chosen fuzzy membership functions into fuzzy sets includes the steps of:
    separating said variables received from the user into input and output groups; and
    grouping membership functions to fuzzy sets for each variable.

6. A non-transitory computer readable medium, storing program instructions for execution by a processor, wherein the processor executes the program instructions to perform a method generating a fuzzy knowledge base for a programmable fuzzy controller used to control a process without the use of a database of historical values of relevant input variables, the method comprising the steps of:
    receiving values of relevant input variables and output variables, including non-linearity values indicating linearity degree, to be controlled from a user without the use of a database of historical values of relevant input variables;
    creating artificial potential fields for each of said relevant input variables and output variables;

sampling each of said potential fields and automatically generating fuzzy membership functions from such sampling;

choosing a number of membership functions from the generated fuzzy membership functions to provide a linearity degree received from the user;

compiling the chosen fuzzy membership functions into fuzzy sets; and mapping the fuzzy sets from relevant input variables to output variables to automatically create fuzzy rules, said fuzzy rules forming the fuzzy knowledge base.

7. The non-transitory computer readable medium according to claim 6, wherein the step of receiving the relevant input variables and output variables from a user without the use of a database of historical values of relevant input variables includes, for each variable, receiving:

minimum, maximum, and equilibrium values;
an importance weight;
a non-linearity value;
a control direction; and
information as to whether said variable is an input variable or output variable.

8. The non-transitory computer readable medium according to claim 6, wherein the step of creating artificial potential fields includes, for each variable received from the user, deriving a function that generates a linear potential field based on said relevant input and output variables, wherein the potential field has its own minimum value at an equilibrium value of each variable.

9. The non-transitory computer readable medium according to claim 6, wherein the step of sampling each of said potential fields includes the steps of:

sampling automatically each potential field in small increments of value; and generating a fuzzy membership function for each small increment sampled, wherein an area of the membership function is proportional to the sampled potential field value.

10. The non-transitory computer readable medium according to claim 6, wherein the step of compiling the chosen fuzzy membership functions into fuzzy sets includes the steps of:

separating said variables received from the user into input and output groups; and grouping membership functions to fuzzy sets for each variable.

11. A computer for generating a fuzzy knowledge base for a programmable fuzzy controller used to control a process without the use of a database of historical values of relevant input variables, the computer comprising:

a processor;
an input device coupled to said processor for receiving inputs from a user;
memory coupled to said processor;
storage coupled to said processor storing program instructions for execution by said processor, wherein said processor executes said program instructions to perform a method generating a fuzzy knowledge base for a programmable fuzzy controller, the method comprising the steps of:

receiving values of relevant input variables and output variables, including non-linearity values indicating linearity degree, to be controlled from a user without the use of a database of historical values of relevant input variables;

creating artificial potential fields for each of said relevant input variables and output variables;

sampling each of said potential fields and automatically generating fuzzy membership functions from such sampling;

choosing a number of membership functions from the generated fuzzy membership functions to provide a linearity degree received from the user;

compiling the chosen fuzzy membership functions into fuzzy sets; and mapping the fuzzy sets from relevant input variables to output variables to automatically create fuzzy rules, said fuzzy rules forming the fuzzy knowledge base.

12. The computer according to claim 11, wherein the step of receiving the relevant input variables and output variables from a user without the use of a database of historical values of relevant input variables includes, for each variable, receiving:

minimum, maximum, and equilibrium values;
an importance weight;
a non-linearity value;
a control direction; and
information as to whether said variable is an input variable or output variable.

13. The computer according to claim 11, wherein the step of creating artificial potential fields includes, for each variable received from the user, deriving a function that generates a linear potential field based on said relevant input and output variables, wherein the potential field has its own minimum value at an equilibrium value of each variable.

14. The computer according to claim 11, wherein the step of sampling each of said potential fields includes the steps of:

sampling automatically each potential field in small increments of value; and generating a fuzzy membership function for each small increment sampled, wherein an area of the membership function is proportional to the sampled potential field value.

15. The computer to claim 11, wherein the step of compiling the chosen fuzzy membership functions into fuzzy sets includes the steps of:

separating said variables received from the user into input and output groups; and grouping membership functions to fuzzy sets for each variable.

16. A programmable fuzzy controller for controlling a process without the use of a database of historical values of relevant input variables, the controller comprising:

an analog-to-digital convertor for connection to analog input signals of a process to be controlled;

a digital-to-analog convertor for providing analog output signals to control the process;

a processor coupled to said analog-to-digital convertor and said digital-to-analog convertor;

an input device coupled to said processor for receiving inputs from a user;

memory coupled to said processor;

storage coupled to said processor storing program instructions for execution by said processor, wherein said processor executes said program instructions to perform a method generating a fuzzy knowledge base for a programmable fuzzy controller and controlling a process using the fuzzy knowledge base, the method comprising the steps of:

receiving values of relevant input variables and output variables, including non-linearity values indicating linearity degree, to be controlled from a user without the use of a database of historical values of relevant input variables;

creating artificial potential fields for each of said relevant input variables and output variables;

sampling each of said potential fields and automatically generating fuzzy membership functions from such sampling;

choosing a number of membership functions from the generated fuzzy membership functions to provide a linearity degree received from the user;

compiling the chosen fuzzy membership functions into fuzzy sets;

mapping the fuzzy sets from relevant input variables to output variables to automatically create fuzzy rules, said fuzzy rules forming the fuzzy knowledge base;

receiving input values of the process to be controlled from said analog-to-digital convertor; and operating on the received input values using said fuzzy knowledge base to provide an output to said digital-to-analog convertor for controlling the process.

17. The controller according to claim 16, wherein the step of receiving the relevant input variables and output variables from a user without the use of a database of historical values of relevant input variables includes, for each variable, providing:

minimum, maximum, and equilibrium values;

an importance weight;

a non-linearity value;

a control direction; and information as to whether said variable is an input variable or output variable.

18. The controller according to claim 16, wherein the step of creating artificial potential fields includes, for each variable received from the user, deriving a function that generates a linear potential field based on said relevant input and output variables, wherein the potential field has its own minimum value at an equilibrium value of each variable.

19. The controller according to claim 16, wherein the step of sampling each of said potential fields includes the steps of:

sampling automatically each potential field in small increments of value; and generating a fuzzy membership function for each small increment sampled, wherein an area of the membership function is proportional to the sampled potential field value.

20. The controller to claim 16, wherein the step of compiling the chosen fuzzy membership functions into fuzzy sets includes the steps of:

separating said variables received from the user into input and output groups; and grouping membership functions to fuzzy sets for each variable.

* * * * *